(12) United States Patent
Pfaltzgraff et al.

(10) Patent No.: US 8,510,960 B2
(45) Date of Patent: Aug. 20, 2013

(54) TRIMMER HEAD SPOOL FOR USE IN FLEXIBLE LINE ROTARY TRIMMER HEADS HAVING IMPROVED LINE LOADING MECHANISM

(75) Inventors: James R. Pfaltzgraff, Portland, OR (US); Richard A. Proulx, Alta Loma, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 352 days.

(21) Appl. No.: 13/021,695

(22) Filed: Feb. 4, 2011

(65) Prior Publication Data
US 2011/0119932 A1 May 26, 2011

Related U.S. Application Data

(63) Continuation-in-part of application No. 11/833,085, filed on Aug. 2, 2007, now Pat. No. 7,882,642.

(60) Provisional application No. 60/824,404, filed on Sep. 1, 2006.

(51) Int. Cl.
*A01G 3/06* (2006.01)
*A01D 34/416* (2006.01)

(52) U.S. Cl.
USPC .............................. 30/276; 56/295

(58) Field of Classification Search
USPC ................... 30/276, 347; 56/12.7, 295, 255, 56/239
See application file for complete search history.

(56) References Cited

U.S. PATENT DOCUMENTS

| | | | | |
|---|---|---|---|---|
| 4,223,440 | A * | 9/1980 | Inaga | 30/276 |
| 6,263,580 | B1 * | 7/2001 | Stark et al. | 30/276 |
| 6,983,543 | B2 * | 1/2006 | Fogle | 30/347 |
| 7,797,839 | B2 * | 9/2010 | Proulx | 30/276 |
| 2003/0226261 | A1 * | 12/2003 | Iacona | 30/276 |
| 2004/0103543 | A1 * | 6/2004 | Fogle | 30/276 |
| 2005/0076515 | A1 * | 4/2005 | Proulx | 30/276 |

* cited by examiner

*Primary Examiner* — Stephen Choi
(74) *Attorney, Agent, or Firm* — Holland & Knight LLP; Richard E. Lyon, Jr.

(57) ABSTRACT

An improved spool construction for carrying a length of cutting line in a trimmer head housing on a flexible line rotary trimmer wherein the spool comprises separately molded upper and lower sections of single piece construction that are pressed together in a snap fitment to define a cylindrical body portion, at least one flange projecting radially therefrom and a line receptor channel having a smooth interior surface that traverses the spool and communicates opposed open outer channel ends in the flange that are radially alignable with opposed line openings in a housing skirt, with an open channel portion in a lower spool surface to provide access to the channel intermediary of the open channel ends with the spool operatively connected to the housing for line loading and replacement without having to interrupt the operative connection between the spool and the housing.

12 Claims, 17 Drawing Sheets

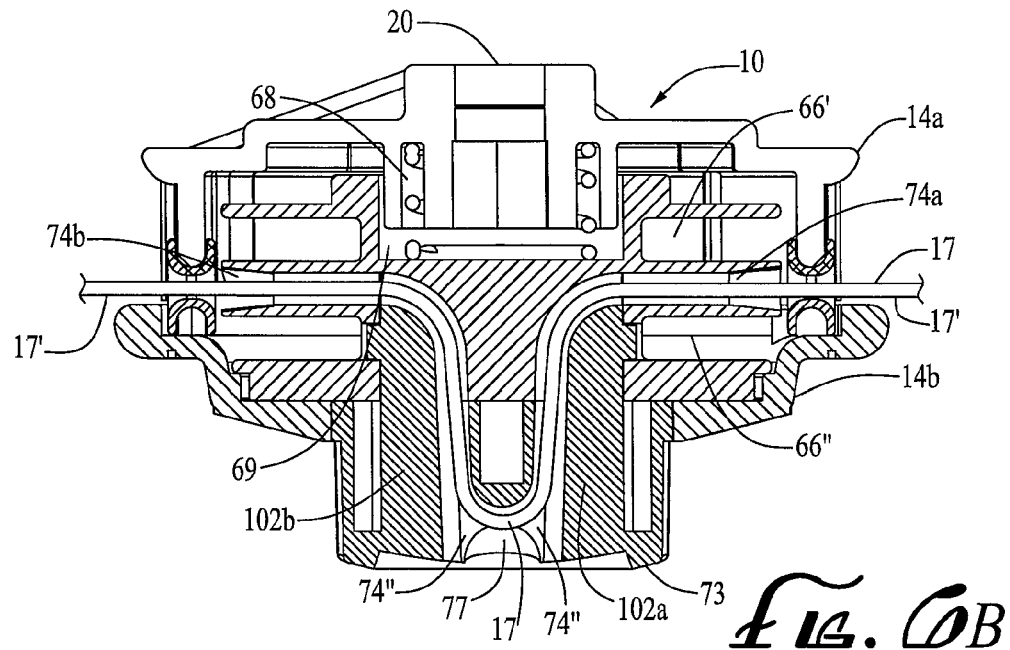
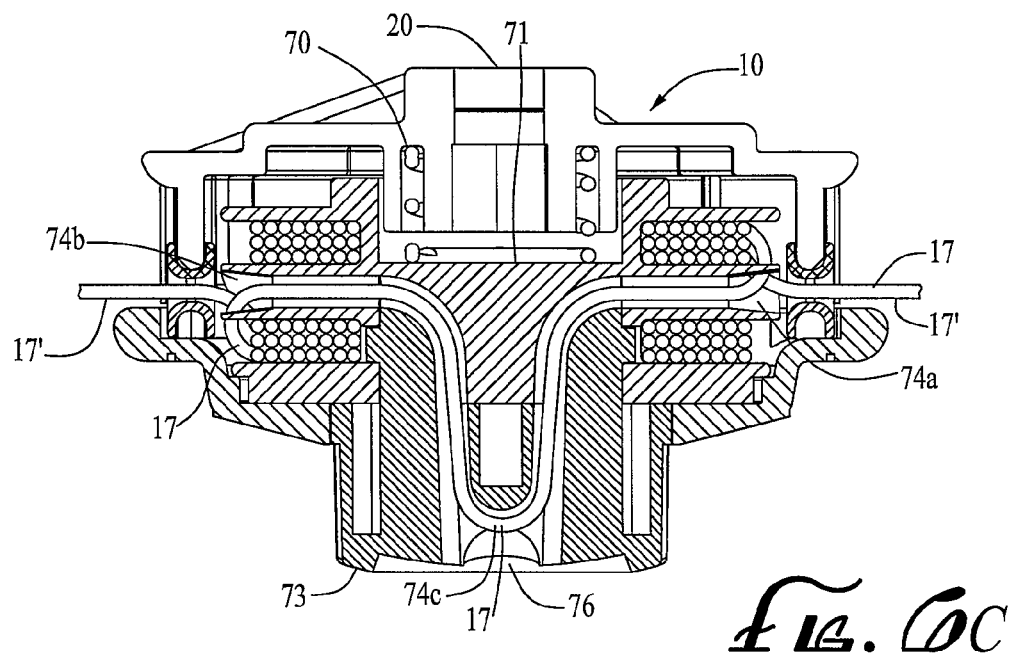

TRIMMER HEAD SPOOL FOR USE IN FLEXIBLE LINE ROTARY TRIMMER HEADS HAVING IMPROVED LINE LOADING MECHANISM

CROSS-REFERENCE TO RELATED APPLICATIONS

This application is a continuation-in-part of application Ser. No. 11/833,085, filed on Aug. 2, 2007 entitled "Trimmer Head for Use In Flexible Line Rotary Trimmers Having Improved Line Loading Mechanism" which claims priority from Provisional Application No. 60/824,404, filed on Sep. 1, 2006.

BACKGROUND OF THE INVENTION

The present invention relates to an improved spool construction for a trimmer head used in flexible line rotary trimming devices used to trim grass, weeds and other vegetation. More particularly, the invention is directed to an improvement in the construction of trimmer head spools of the type disclosed in U.S. Pat. No. 7,797,839 that allow new cutting line to be wound thereon and worn or broken line to be removed and replaced without having to separate the spool from the trimmer head housing.

Trimmer heads used in flexible line rotary trimmers generally carry one or two lengths of flexible nylon cutting line wrapped about an interior spool with the ends of the line or lines projecting outwardly through opposed apertures in the side wall of the trimmer head. The head is threadably mounted on the end of an elongated shaft and rotated at a high velocity by a gas or electric motor so that the ends of the cutting line project radially from the head and sever weeds or other vegetation. When cutting line projecting from the head breaks off or becomes overly worn, it must be severed and fresh line extended from the spool through the line outlet eyelets in the side of the housing. Bump-feed type heads include a line feed-out mechanism which responds to a bump on the ground intentionally applied by the operator to feed out a measured length of fresh cutting line which is typically cut to the desired length by a knife blade projecting from a shield attached to the trimmer above the cutting head and spaced a predetermined distance from the perimeter of the trimmer head housing. Manual heads do not include any such line feed-out mechanism. The spool must be manually rotated relative to the housing to pay out additional cutting line. Automatic heads include a mechanism that detects a loss of mass in the cutting line projecting from the head during use and, without the need for any action by the operator, pay out additional lengths of line from the spool through the eyelets.

In each of these types of heads, the length or lengths of cutting line are typically wound onto the spool by hand. As most cutting heads employ a single length of line wrapped about a spool with the end portions projecting from opposed sides of the cutting head, care must be taken during the winding of the spool to avoid crossing or otherwise tangling of the two lines within the spool which interferes with the paying out of fresh line. This is particularly important in automatic and bump-feed heads where centrifugal force is utilized to pull the new lengths of line from the spool during use as the head is being bumped against the ground as any line tangle will interfere with the proper feeding of the line. Difficulty in properly loading the line on the spool is the most common complaint of home users of flexible line trimmers. It also is a time consuming task for the professional user.

In many of the prior art trimmer heads, it is necessary to separate the spool from the housing to wind the cutting line about the spool. Various channel configurations in and through the spool have been developed that enable the line to be fed onto the spool through the eyelets in the housing without having to first remove the spool from the housing. While those configurations do facilitate the loading of line onto the spool, they did not eliminate the need to remove the spool from the housing (known in the trade as splitting the head) in the event the cutting line breaks proximate the eyelet during use. Unfortunately, this is a frequent occurrence when the rapidly rotating line strikes a solid object such as a fence post. When such breakage occurs, the load pulling outwardly on the line during use is effectively eliminated and the line recoils, drawing the severed end of the line inwardly through the housing eyelet. Fresh line can no longer be paid out through the eyelets without first splitting the head to gain access to the spool in order to unwind fresh line from the spool and thread the fresh line through the eyelet in the housing.

The trimmer heads disclosed in U.S. Pat. No. 7,797,839, the contents of which are incorporated herein by reference as though fully set forth herein, enable the user to quickly, easily and uniformly wind lengths of cutting line onto the spool and to remove and reload line on the spool without having to split the head even in those instances where line breakage occurs proximate the housing eyelet during use. To provide such loading and unloading of the line, the trimmer head spool is provided with a line receptor channel that traverses the spool and has geometrically opposed open ends through which the cutting line can enter and exit the spool. At least a transverse portion of the channel that is intermediary of its opposed ends and preferably located proximate the bottom surface of the spool, is open and exposed such that the portion of the cutting line passing therethrough is accessible to the user when the spool is operatively connected to the trimmer head housing.

Winding of the cutting line onto the spool is achieved by first aligning the spool with the trimmer head housing to which it is operatively connected such that the opposed open ends of the line receptor channel are radially aligned with the eyelets and/or openings in the surrounding housing sidewall. In the preferred embodiments of the invention, an end portion of the line can be directed through one of the openings in the housing wall and into the aligned line receptor channel. The line passes through a portion of the spool and exits the channel adjacent one side of the open intermediary portion of the channel. The end portion of the line is then directed back into the receptor channel on the opposite side of the open intermediary portion thereof and is extended through the remainder of the channel in the spool and out the other aligned opening in the housing sidewall. The line is then pulled through the trimmer head until approximately half of the total length of the line is protruding from each side of the trimmer head with a central portion of the line being disposed in the open intermediary portion of the line receptor channel. Alternatively, the two extended end portions of the cutting line can be inserted into and directed through the portions of the receptor channel disposed on the opposite sides of the open intermediary portion thereof. Each end portion of the cutting line is then pulled through one of the opposed pairs of openings in the spool and housing wall until again, approximately half of the total length of line is protruding from each side of the trimmer head and a central portion of the line is positioned in the open intermediary portion of the line receptor channel. Subsequent rotation of the spool relative to the housing will wind the cutting line about the spool.

To provide an even winding and distribution of the protruding cutting line about the spool and prevent tangling within the spool during winding, a cam and cam follower mechanism is provided in the operative connection between the spool and housing to cause the spool to translate upwardly and downwardly with respect to the housing when the spool is gripped by the lower body portion of the spool and rotated in a given direction relative to the housing. This reciprocating movement of the rotating spool with respect to the housing provides for an even distribution of the cutting line about the spool as the line is wound thereon. To remove the line from the head, the user need only grip the exposed portion of the line in the open portion of the line receptor channel and pull that portion of the line in a direction away from the spool and substantially parallel to the axis of rotation of the spool, whereupon the line will simply unravel from the spool and separate from the head.

While the trimmer head that is the subject of U.S. Pat. No. 7,797,839 has greatly simplified line loading and replacement for the user, the line receptor channel in the trimmer head that traverses the spool requires a relatively complicated molding process and the exercise of substantial care during fabrication to provide a smooth continuous interior channel surface along the curvilinear portions thereof. The existing spools in which that channel is formed also are relatively heavy due to the amount of material employed in their fabrication and are subject to warpage and surface irregularities as a result of shrinkage during the cooling of the freshly molded spools due to large concentrations of material. The spool construction of the present invention retains all of the line loading and replacement benefits of the trimmer head disclosed in U.S. Pat. No. 7,797,839 while obviating the above discussed fabrication issues.

SUMMARY OF THE INVENTION

Briefly, the present invention comprises an improved spool construction for a rotary trimmer head configured to facilitate loading of new cutting line onto the trimmer head spool and the removal of worn or broken line from the spool for replacement, both without having to interrupt the operative connection between the spool and the housing. To provide such loading and unloading of the line, the trimmer head spool is operatively connected to the trimmer head housing for rotation therewith about a common axis and includes a cylindrical body portion, at least one flange projecting radially therefrom so as to define at least one cutting line storage area about the body portion of the spool adjacent the flange and a line receptor channel that traverses the spool. The line receptor channel has geometrically opposed open ends located in a spool flange that are radially alignable with the line openings in the housing upon relative rotation of the spool and the housing. The channel preferably extends radially inwardly from the opposed open ends thereof, downwardly along opposed portions of the body portion of the spool and transversely of the body portion proximate the lowermost surface of the spool where the channel defines an open portion so as to provide access to the channel while the spool remains operatively connected to the housing. This configuration allows a length of cutting line to be inserted through the line receptor channel and the aligned openings in the housing skirt and wrapped about the spool without having to interrupt the operative connection between the spool and the housing, and in the event of a line breakage proximate a line opening in the housing skirt, a user can grip in the open portion of the channel and pull on the line in a direction away from the spool and generally parallel to the axis of rotation, whereby the cutting line and the spool can be pulled from the head for replacement without having to interrupt the operative connection between the spool and the housing.

To facilitate the fabrication of the above described line receptor channel in the spool so as to provide the channel with a continuously smooth interior wall surface while reducing the weight of the spool and concentrations of material, the spool of the present invention is molded in two separate sections that can be readily locked together to form the trimmer head spool. The upper spool section includes the spool flange in which the outer line receptor channel openings are formed and through which the inwardly extending opposed radial channel portions extend. The opposed radial channel portions terminate at their inner ends in opposed openings on opposite sides of a large centrally disposed cavity in the upper portion of the spool. A pair of depending vertical walls extend across the cavity in parallel alignment with the outer edges of the opposed inner channel openings and a pair of guide surfaces extend inwardly and downwardly between the two depending vertical walls along opposed curvilinear paths from the inner channel openings and terminate in radially spaced substantially vertical orientations. The resulting configuration defines a pair of opposed outer hollow cavities separated by the two depending parallel walls and a pair of radially spaced and extending opposed inner cavities disposed between the depending walls and bordered along their respective upper and inner ends by the curvilinear guide surfaces.

The lower spool section defines a pair of hollow upwardly extending and laterally spaced projections configured to be received in a mating relationship within the outer cavities in the upper spool section and a centrally disposed radially extending opening between the two upstanding projections that is adapted to receive in a mating relationship the two depending parallel walls in the upper spool section. A pair of radially spaced webbings preferably extend transversely between the upwardly extending projections in the radially extending opening therebetween and a pair of upstanding line guide members are disposed in the spaced opening proximate the outer ends of said webbing that are adapted to be received within the inner radially opposed cavities in the upper spool section. The inner end surfaces of the line guide members and the outer ends of the webbings are concave and configured to cooperate with the inwardly and downwardly extending guide surfaces disposed between the vertical walls in the upper spool section upon said sections being pressed together so as to define the portions of the line receptor channel disposed within the body of the spool and provide a continuously smooth interior channel surface over such portions of the channel.

A pair of radially spaced line inlet/outlet openings are provided in the lower surface of the lower spool section between the lower inner ends of the line guide members and the lower outer ends of the webbings and a radial recessed channel in the lower end of the lower spool section extends between said inlet/outlet opening to define the open transverse portion of the line receptor channel to provide access to the cutting line extending therethrough.

The guide members on the lower spool section preferably each extend upwardly from the lower spool surface without additional lateral support so as to allow the guide members to flex slightly in a radial direction such that the outer upper end surfaces of the guide members can be provided with outwardly projecting locking elements adapted to be received within opposed apertures formed in the upper spool section below the inner channel openings therein upon the upper and lower spool sections being pressed together whereby the upper section of the spool can be readily and releasably locked to the lower spool section.

The above-described spool construction not only allows for a smooth interior channel surface, it also minimizes material usage and concentrations to provide an improved spool product.

BRIEF DESCRIPTION OF THE DRAWINGS

FIGS. 6A and 6B are sectional views of the trimmer head as shown in FIG. 5 illustrating the loading of the cutting line.

FIG. 6C is the sectional view of the trimmer head as shown in FIG. 5 with the cutting line wound thereon.

DETAILED DESCRIPTION OF THE PREFERRED EMBODIMENTS

Figure 1:
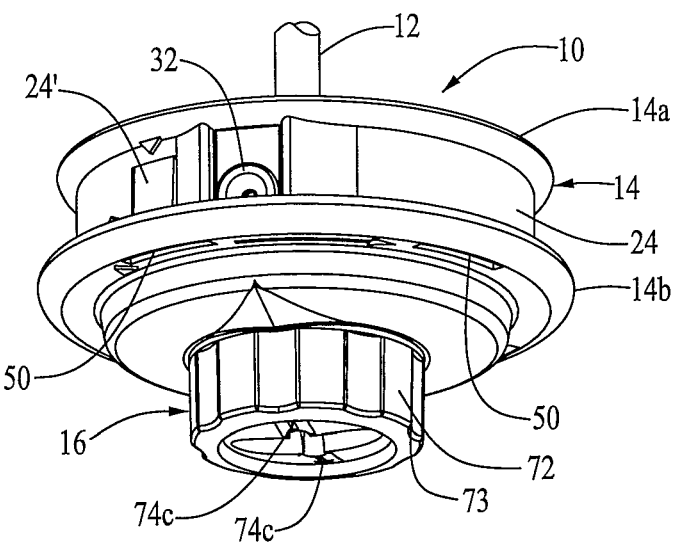
FIG. 1 is a perspective view of a trimmer head including a first embodiment of a spool of the present invention as seen from below.
Figure 2:
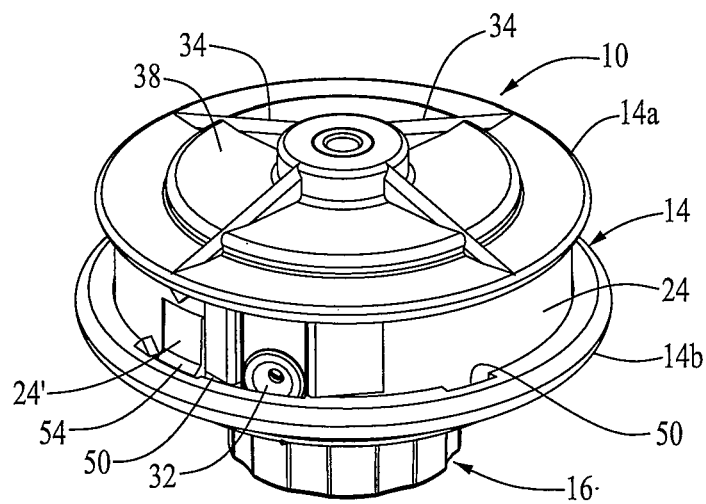
FIG. 2 is a perspective view of the trimmer head illustrated in FIG. 1 as seen from above.

Referring now in detail to the drawings, a preferred embodiment of a bump-feed type trimmer head 10 of the type employing the spool of the present invention is shown in FIGS. 1-15. The trimmer head 10 of the present invention shown therein is designed to be mounted on the extended end of a rotatable drive shaft 12 on a gasoline or electric powered rotary trimmer (not shown). The trimmer head 10 shown therein is a bump-feed type head having the drive and line feeding mechanism disclosed in U.S. Pat. No. 4,959,904 and the rapid line loading and replacement feature disclosed in U.S. Pat. No. 7,797,839.

Trimmer head 10 comprises a housing 14, spool 16, coil spring 18 and drive bolt 20. The housing comprises an upper portion 14a and a lower portion 14b that are releasably secured together about the spool. The trimmer head housing and spool are preferably formed by injection molding a nylon 6 copolymer. The upper housing 14a defines an upper circular wall 22, a cylindrical housing skirt 24 depending therefrom and a centrally disposed tubular extension 26. Extension 26 is axially aligned with the central axis of rotation of the head and includes a hexagonal lower portion 26a and an upwardly projecting portion 26b. The tubular extension 26 is configured to receive the drive bolt 20 with the upper portion 20a of the bolt being cylindrical in cross section and the lower portion 20b being hexagonal in cross section to mate with the hexagonal lower portion 26a of the tubular extension. The lower portion of the drive bolt and the tubular extension in the housing could also be square or otherwise configured to provide the desired interference fit between the drive bolt and housing. The drive bolt 20 is secured within the tubular extension 26 by heat shrinking the extension 26 about the bolt. An annular groove 20c is provided about the drive bolt to create an interference fit between the bolt and housing upon the shrinkage of the plastic housing material, to enhance the securement of the bolt to the housing. Other means for securing the drive bolt to the housing also could be employed. The drive bolt 20 may define an internally threaded cylindrical bore 20d extending axially therethrough for threaded engagement with the drive shaft of the trimmer.

The upper portion of housing 14 also defines a pair of opposed slots 30 in the depending cylindrical housing skirt 24. The slots 30 are open at their lower ends and are adapted to receive a pair of opposed metal outlet eyelets 32 in a press fitment. Alternatively, the eyelets could be press fit through apertures in the housing skirt as in the first embodiment. Portions of the housing skirt 24 adjacent the eyelets are preferably raised or ramped outwardly to protect the eyelets from foreign objects during use. A plurality of radially projecting heat dissipation ribs 34 are fowled on the upper circular wall 22 of the upper housing 14a. A plurality of equiangularly disposed and outwardly projecting radial tabs 36 also are provided at the lower end of the cylindrical housing skirt 24 for the securement of the lower housing portion 14b to the upper portion 14a as will be described.

Figure 7:
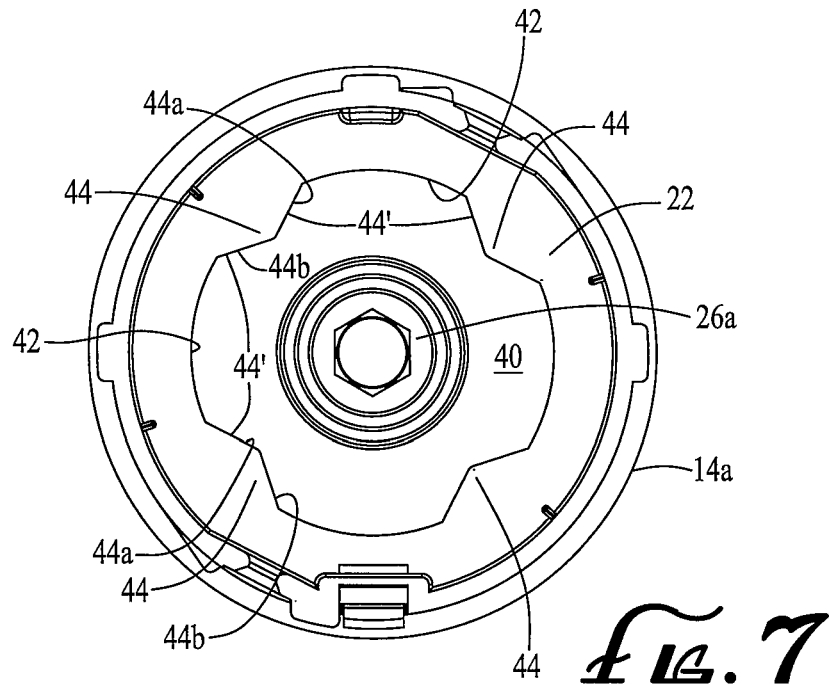
FIG. 7 is a bottom plan view of the interior of the upper portion of the housing of the trimmer head shown in FIGS. 1-6C.

The upper circular wall 22 of the trimmer head housing 14 has a raised central portion 38 so as to define an interior recessed area 40 therein. As shown in FIG. 7, the perimeter wall surface 42 extending about the recessed area 40 defines four equiangularly disposed projections 44 that project radially inwardly from wall surface 42. Each of the projections defines a pair of angularly disposed surfaces 44' that offset by 135° and are parallel to the axis of rotation of the head. These projections define cam surfaces.

The leading surface on each of the projections 44 defines an upper cam 44a (counterclockwise rotation as seen from above). The trailing surfaces each define an upper slide surface 44b. The surface of each of the cams is again parallel to the axis of rotation of the head. The upper slide surfaces 44b may be downwardly inclined, preferably radiused, particularly on smaller sized heads, to facilitate line loading as will be discussed.

Figure 4:
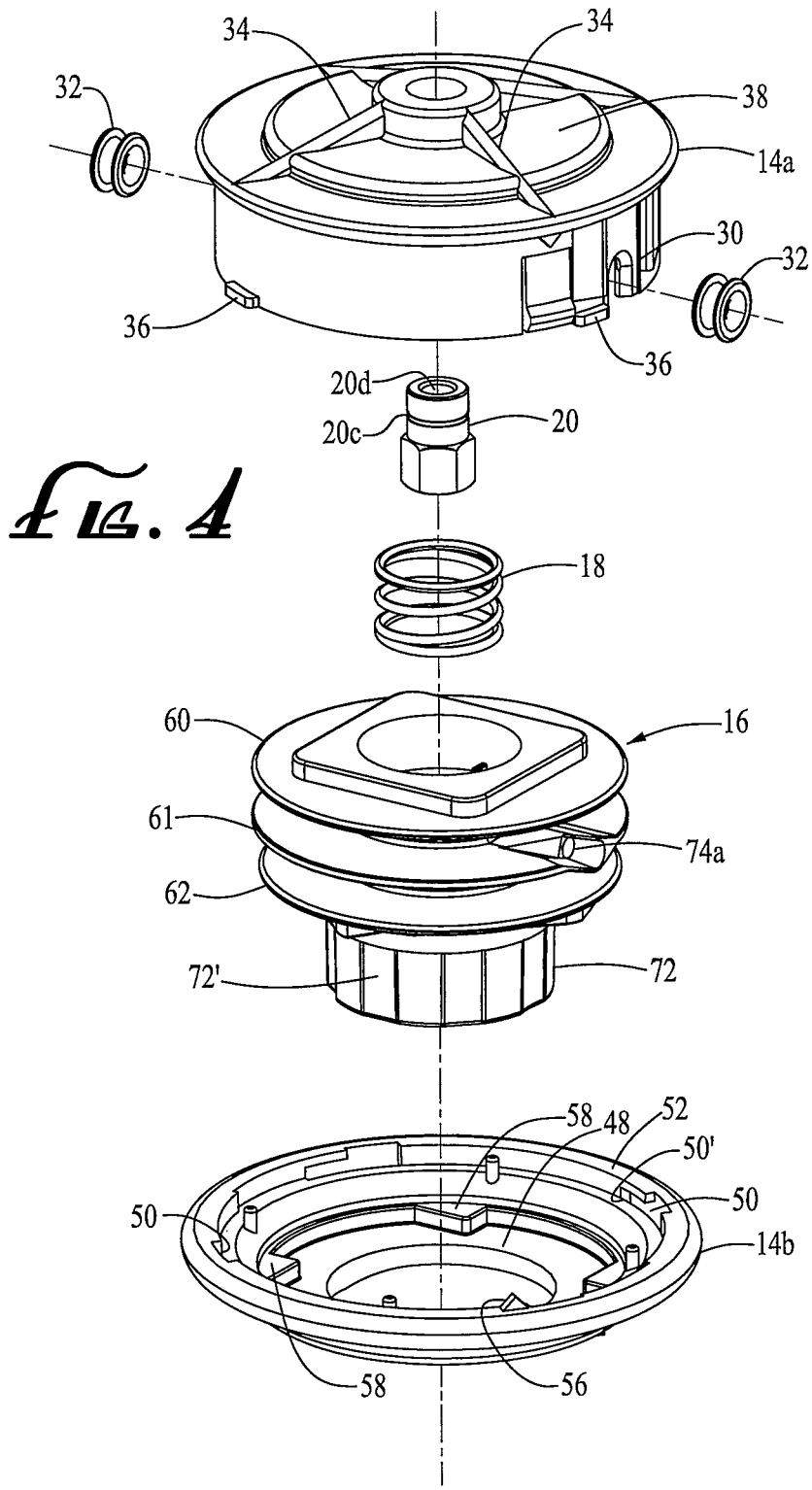
FIG. 4 is an exploded perspective view of the various elements comprising a trimmer head similar to FIG. 3 but as viewed from above.

The lower housing portion 14b of the trimmer head 10 defines an enlarged circular opening 46 in the underside thereof, an annular horizontal surface 48 disposed about opening 46, and a plurality of equiangularly disposed slots 50 (four being shown) adjacent the upper surface 52 of the lower housing portion 14b for receiving a corresponding number of locking tabs 36 on the upper housing portion 14a. Slots 50 are provided with narrow offset portions 50' as seen in FIG. 4. To attach the upper housing portion 14a with the lower housing portion 14b, the user first inserts the four rigid locking tabs 36 of the upper housing portion 14a into four of the slots 50 in the lower housing portion 14b. Resilient cantilevered portion 24' of the housing skirt 24 defines a tab 54 that will be simultaneously pressed radially inward by the protrusion 56 in the lower housing portion 14b as the upper housing portion 14a and the lower housing portion 14b are mated. The user then rotates the upper housing portion 14a counterclockwise with regard to the lower portion 14b, causing the locking tabs 36 to translate into the offset portions 50' of the slots 50. When the locking tabs 36 have translated completely into the offset portions 50', the protrusion 56 will no longer be in contact with the tab 54 and the cantilevered portion 24' will return to its original, unstressed position. In this configuration, protrusion 56 can prevent the upper housing portion 14a from translating clockwise and the upper housing portion 14a can be securely attached to the lower housing portion 14b.

Figure 8:
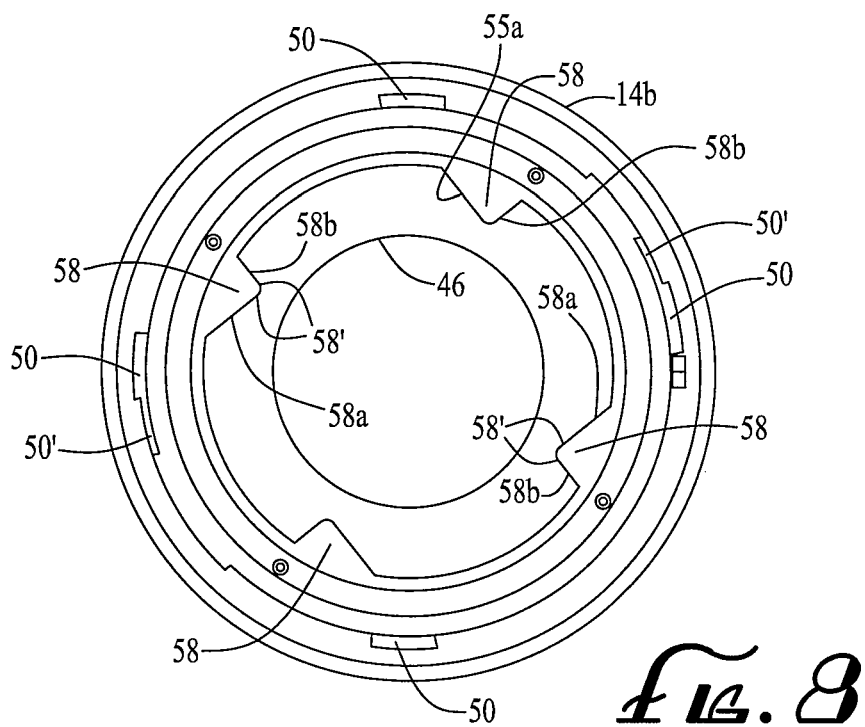
FIG. 8 is a top plan view of the interior of the lower portion of the housing of the trimmer head shown in FIGS. 1-6C.
Figure 9:
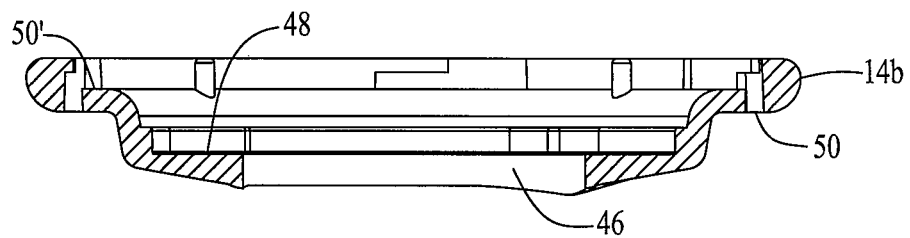
FIG. 9 is a cross-sectional view of the lower portion of the housing of the trimmer head taken along the line 9-9 in FIG. 8.

The lower housing portion 14b further defines four equiangularly disposed projections 58 on the annular surface 48 adjacent opening 46 as seen in FIG. 8. The angularly disposed surfaces 58' on projections 58, like the surfaces 44' in the projections 44 in the upper housing portion 14a, define angularly disposed lower cams 58a and lower slide surfaces 58b. The lower cams 58a are on the leading surfaces of the projections, extend parallel to the axis of rotation of the cutting head and again can be angled at 135° with respect to the adjacent slide surfaces. The slide surfaces 58b can be radiused upwardly. IA a preferred embodiment, however, the slide surfaces 58b on the lower projections 58 are not angled at 135° with respect to the cam surfaces 58a but at a lesser angle as seen in FIG. 8 to accommodate a preferred ramping configuration on the leading sides of the lower cam follower which is defined by the spool as will be described.

Figure 5:
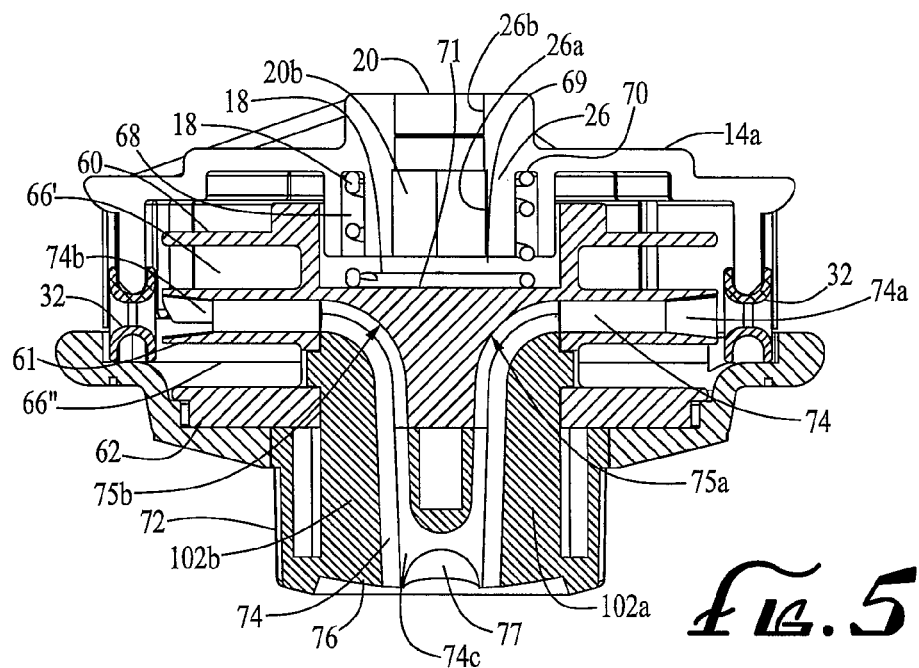
FIG. 5 is a sectional view of the trimmer head shown in FIGS. 1-4, illustrating the spool and trimmer head housing before the cutting line is loaded.

As seen, for example, in FIGS. 3-6, 11A and 11B, the spool 16 in trimmer head 10 defines an upper flange 60, a middle flange 61 and a lower flange 62 carried by a cylindrical upper body portion 64 so as to define two annular storage areas 66' and 66" between flanges 60 and 61, and between flanges 61 and 62, respectively, for carrying coils of flexible nylon cutting line 17 wrapped about body portion 64 such that upon assembly, the end portions 17' of the cutting line will extend outwardly through the outlet eyelets 32 as seen in FIG. 6C. An annular chamber 68 is provided in the interior of upper housing 14a about the lower portion 26a of tubular extension 26 and is open at its lower end. The cylindrical chamber 68 defines an upper spring abutment surface 70. A cylindrical chamber 69 having an open upper end is disposed about the central axis of rotation in the upper end of the spool 16 and defines a lower spring abutment surface 71. When head 10 is assembled, the tubular extension 26 on the upper housing projects into chamber 69 in the spool and the coil spring 18 extends between and bears against the spring abutment surfaces 70 and 71 as seen in FIGS. 5 and 6. The lower body portion 72 of the spool 16 is provided with a knurled outer surface 72' for gripping the spool and projects through the opening 46 in the bottom of the lower housing portion 14b such that the lowermost end 73 of spool 16 can be bumped against the ground to pay out additional cutting line through the opposed eyelets 32 during use.

Spool 16 defines a line receptor channel 74 extending therethrough from a first open end 74a to a second opposed open end 74b and having an open accessible portion 74c therebetween. In the embodiment of the invention illustrated in FIGS. 1-14C, the opposed openings 74a and 74b of the line receptor channel 74 are located in the middle flange 61 and when the spool 16 is secured within housing 14, the channel openings are radially aligned with the eyelets 32 in the skirt 24 of the upper housing 14a (see, e.g. FIGS. 5 and 6), enabling the cutting line 17 to be inserted into the line receptor channel through one of the eyelets 32 without having to remove the spool from the housing. The line receptor channel 74 extends radially inwardly from the opposed channel openings 74a and 74b through flange 61, turns downwardly at 75a and 75b in relatively wide radius curves and extends downwardly through opposed interior portions of the lower spool body portion 72, outwardly through laterally spaced inlet/outlet openings 74' and 74" in a lower recessed area 76 of the spool and transversely across the recessed portion 76 of the spool. The portion of channel 74 extending across the lower recessed portion 76 of the spool is the open or exposed portion 74c of the channel providing access to the portion of cutting line 17 extending therethrough. Channel portion 74c preferably is defined by a concave surface or is of an inverted u-shaped configuration to assist in guiding the cutting line through the lower recessed portion 76 of the spool. Depressions 77 are provided in the lower end of the spool adjacent the open portion 74c of channel 74 to facilitate gripping the cutting line extending across the transverse portion as will be explained. At the lowermost end 73 of the spool and extending about the recessed and transversely extending open portion 74c of the line receptor channel 74 is a bumper surface 78 adapted to be pressed against the ground to effect pay out of fresh lengths of cutting line.

Figure 10:
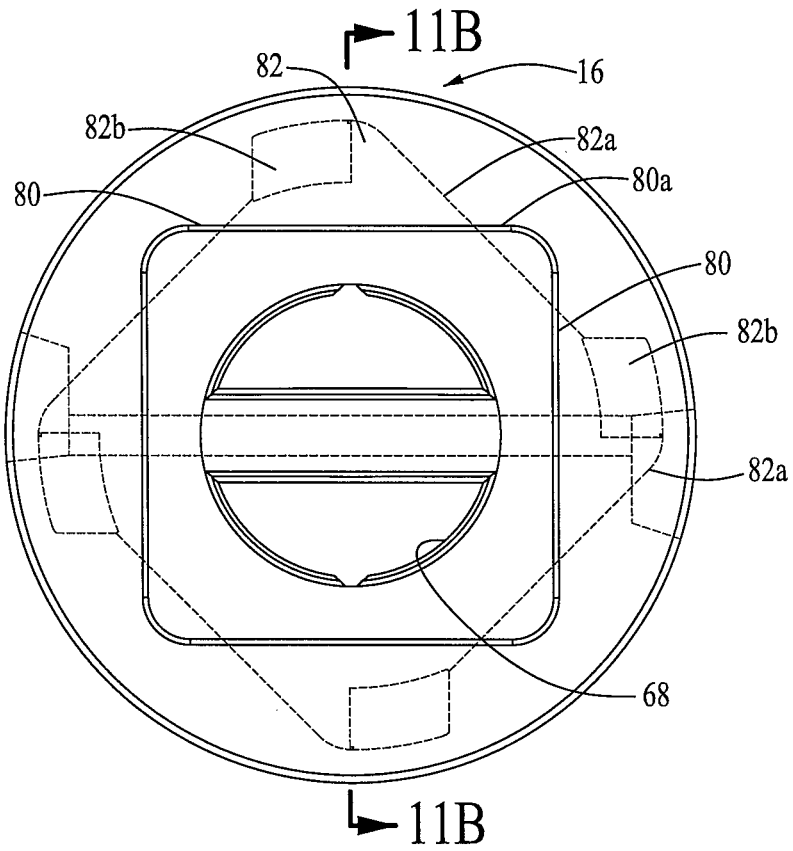
FIG. 10 is a top view of the spool of the trimmer head shown in FIGS. 1-6C showing the relative positioning of the lower cam follower with respect to the upper cam follower with the lower cam follower and line openings being shown in dotted lines.
Figure 11A:
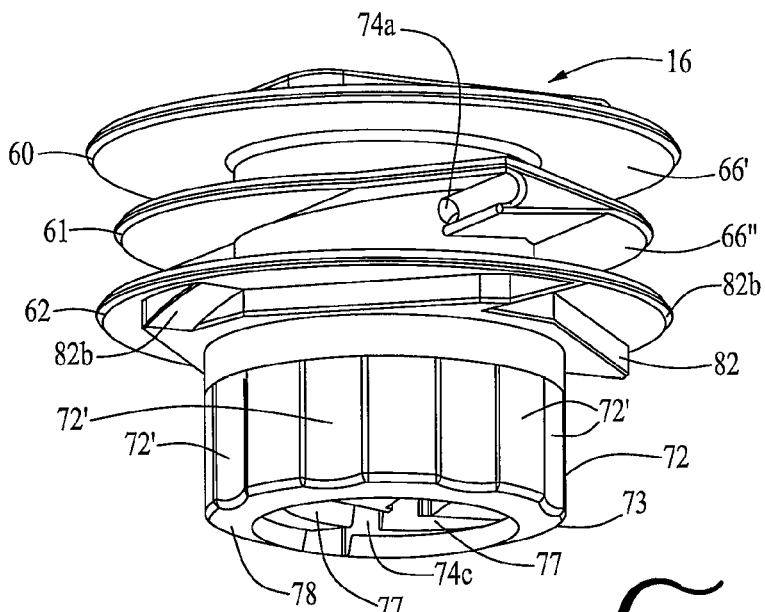
FIG. 11A is a perspective view of the spool of the trimmer head shown in FIGS. 1-6C.
Figure 11B:
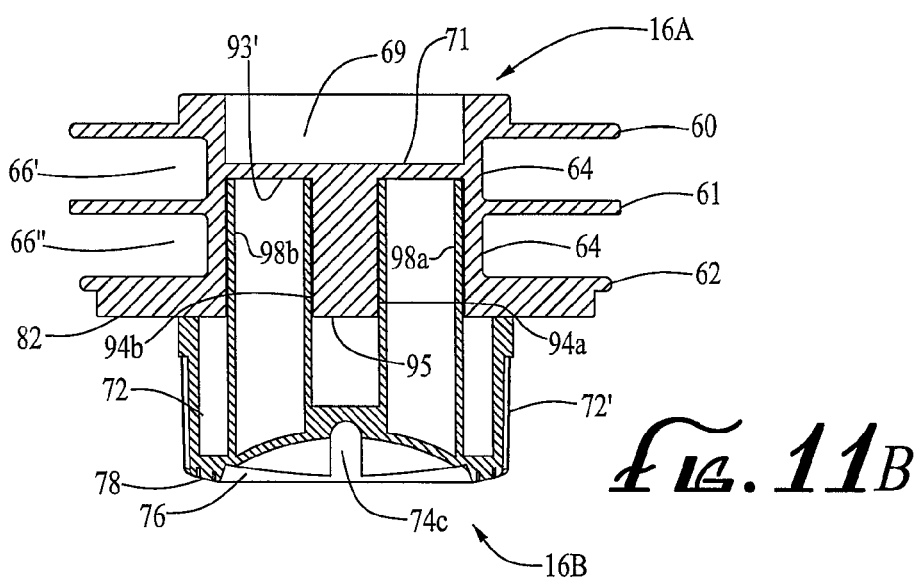
FIG. 11B is a cross-sectional view of the spool of the trimmer head shown in FIGS. 1-6C and is taken along the line 11B-11B in FIG. 10.
Figure 12:
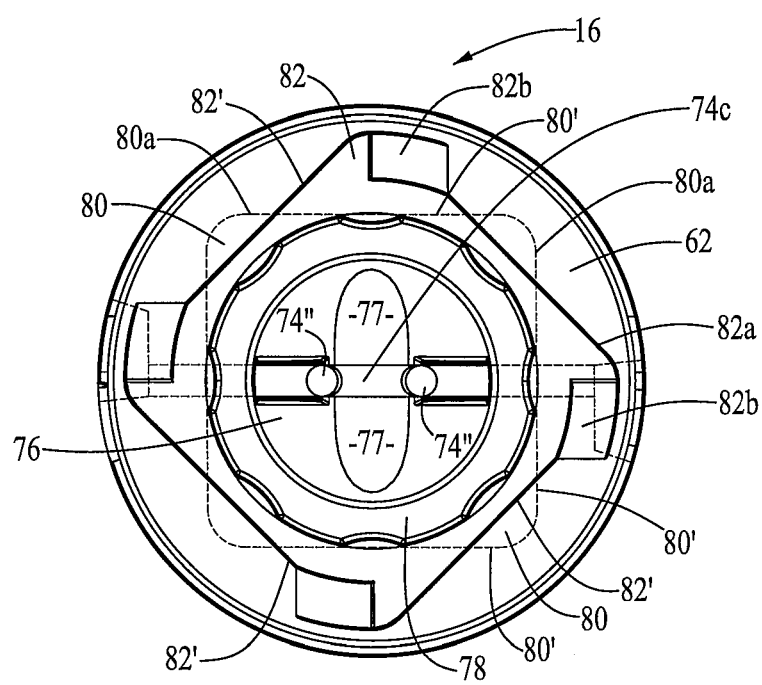
FIG. 12 is a bottom plan view of the spool of the trimmer head shown in FIGS. 1-6C showing the relative positioning of the upper cam follower with respect to the lower cam follower and with the upper cam follower and line openings being shown in dotted lines.

The upper flange 60 on spool 16 defines an upper cam follower 80 on its upper surface and the lower spool flange 62 defines a lower cam follower 82 on its lower surface as seen in FIGS. 10, 11A, and 12. While other configurations could be employed, both cam followers are preferably of a square configuration, defining four perpendicular surfaces 80' and 82' respectively, and are offset by 45° with respect to the central axis of rotation of the trimmer head. The cam abutment surfaces 80a and 82a defined by the trailing surfaces of the upper and lower cam followers are again parallel to the axis of rotation of the head. The leading surfaces of the lower cam follower which define sliding surfaces 82b may be inclined upwardly proximate the corners thereon so as to provide smoother ratcheting if needed. Also, the leading surfaces of the upper cam follower may also be inclined downwardly to facilitate line feeding. Such a downward inclination of the trailing edges is particularly preferable on the smaller heads where the length of each of the cam follower surfaces is shorter which otherwise might make the relative rotation of the spool and housing during line winding more difficult. It may also prove desirable to incline the trailing surfaces of the upper and lower cams.

Figure 3:
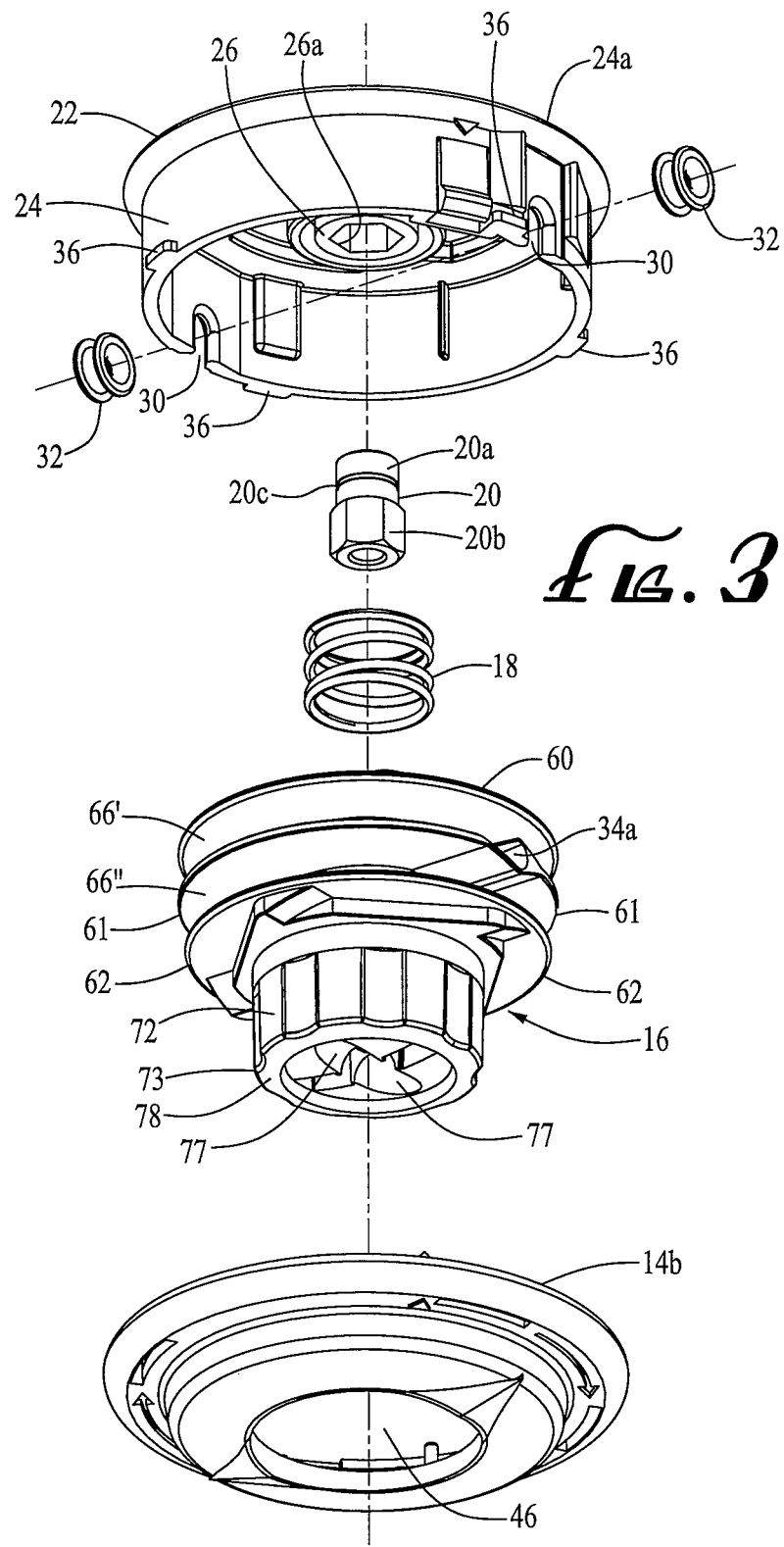
FIG. 3 is an exploded perspective view as seen from below of the various elements comprising the embodiment of the trimmer head illustrated in FIGS. 1 and 2.

In the preferred configuration, the sliding surfaces 82b on the lower cam follower are defined by inclined ramps as seen in FIGS. 3, 10 and 12 to provide a smoother ratcheting of the spool during the winding of the cutting line thereon due to the more gradual incline than that which would be provided by radiused surfaces. As illustrated in FIGS. 7 and 8, the corresponding slide surfaces 58b on the projections 58 defined by the lower housing portion 14b are inclined inwardly more sharply than the corresponding surfaces on the projections 44 on the upper housing portion 14a to provide more space adjacent the slide surfaces on the projections 58 to accommodate these inclined ramps on projections 44 when the spool 16 translates upwardly as occurs when the trimmer head is bumped against the ground to pay out fresh line and during the manual rotation of the spool to effect the winding of the cutting line thereon.

During use, the lower cams 58a on the lower housing portion 14b are aligned with and abut the lower cam abutment surfaces on the trailing surfaces of the lower cam follower 82. Accordingly, as the housing is rotated in a counterclockwise direction by the trimmer drive, the spool is rotated with the housing. In this drive position, the upper cams 44a are upwardly spaced from upper cam follower 80 so that the driving force is generated solely by the lower cams. When the bumper surface 78 is pressed against the ground, the spool 16 is forced upwardly within the housing, disengaging the lower cam abutment surfaces 82a on the lower cam follower from the lower cams 58 and bringing the upper cam abutment surfaces 80a on the upper cam follower 80 into alignment and immediate abutment with the upper cams 44a whereupon the driving force is effected solely by the upper cams. When the bumper surface 78 is lifted from the ground, the coil spring 18 forces the spool downwardly, disengaging the upper cam follower from the upper cams and re-engaging the lower cam follower with the lower cams. With the first embodiment of the invention, with each bump on the ground effects a relative rotation of the spool and housing of 90° results, regardless of the duration of the bump. During this relative rotation, centrifugal force causes a predetermined amount of fresh cutting line to be paid out through the opposed eyelets 32 in the trimmer head housing.

Figure 6A:
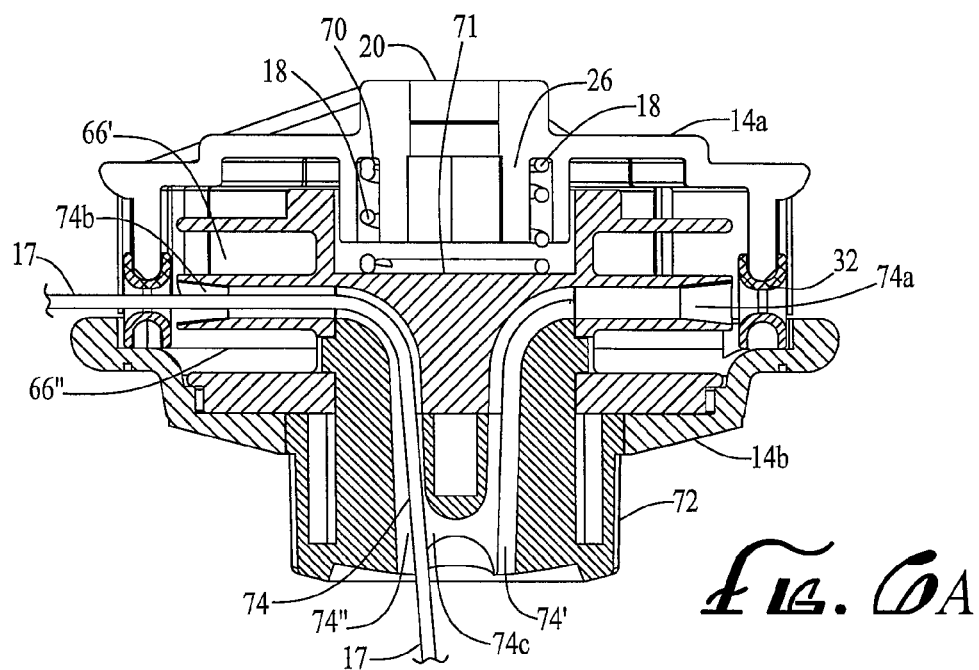

To load the cutting line 17 about spool 16, the opposed open ends 74a and 74b of the receptor channel 74 are aligned with the eyelets 32 such that a single length of cutting line 17 can be inserted through one of the outlet eyelets 32 of the upper housing portion 14a and into and through the adjacent aligned open end 74a or 74b of the receptor channel 74. Printed indicia, such as arrows 92 and 92' illustrated in FIGS. 14A and 15, can be provided on the outer surface of the lower housing portion 14b and in the recessed area 76 in the lower end of the spool to facilitate proper alignment of the line receptor channel with the eyelets 32 in the housing skirt. As the cutting line is pushed into the line receptor channel 74 through, for example, open end 74b, the end portion 17' of the line passes about the curvilinear channel portion 75b and downwardly through the channel and out the opening 74" in the recessed area 76 in the lower end of the spool as illustrated in FIG. 6A. The end portion 17' of the line projecting through opening 74" can then be readily grasped and pulled downwardly, causing more of the cutting line to be drawn inwardly through the eyelet and the adjacent portion of the line receptor channel 74. The downwardly extending end portion 17' of the line is then redirected inserted back up through lower channel opening 74' and pushed upwardly through the remainder of the channel 74 and out through the other channel end 74a and the aligned eyelet. As the cutting line is pushed upwardly through the lower channel opening 74', it is drawn along the exposed transverse portion 74c of the channel and is directed by the surrounding channel wall outwardly through the channel 74 and to and through the adjacent eyelet to the position illustrated in FIG. 6B.

The cutting line 17 continues to be pulled through the trimmer head 10 until the midway point on the length of cutting line 17 to be loaded onto the head 10 is disposed in the open or exposed portion 74c of the line receptor channel. In this position, approximately equal lengths of line project through each of the opposed eyelets 32. Alternatively, the two end portions 17' of the length of cutting line to be loaded on the spool 16 could each be inserted through one of the separate channel openings 74' and 74" in the bottom of the spool and pushed upwardly through their respective channel portions and out through the opposed ends of the channel 74 and aligned eyelets.

Figure 13A:
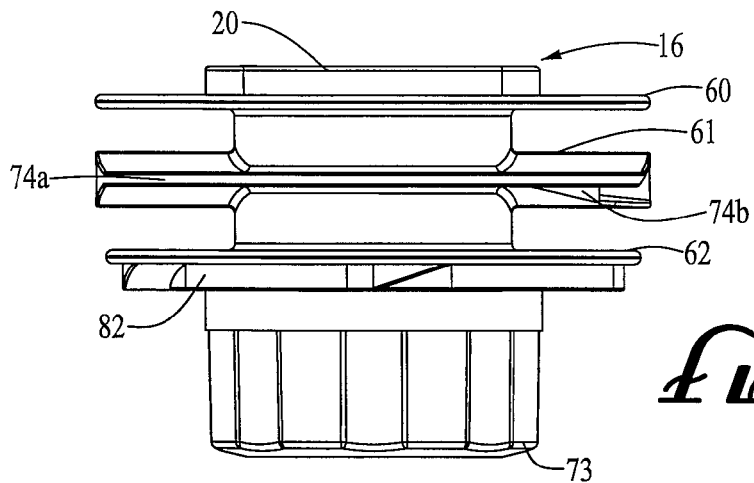
FIG. 13A is a side view of the spool of the trimmer head shown in FIGS. 1-6C.
Figure 13B:
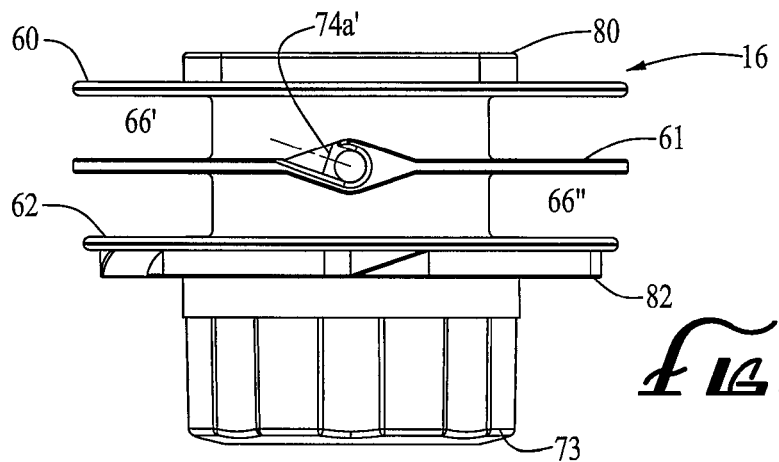
FIG. 13B is a front view of the spool of the trimmer head shown in FIGS. 1-6C as viewed from the left side of FIG. 14A.
Figure 13C:
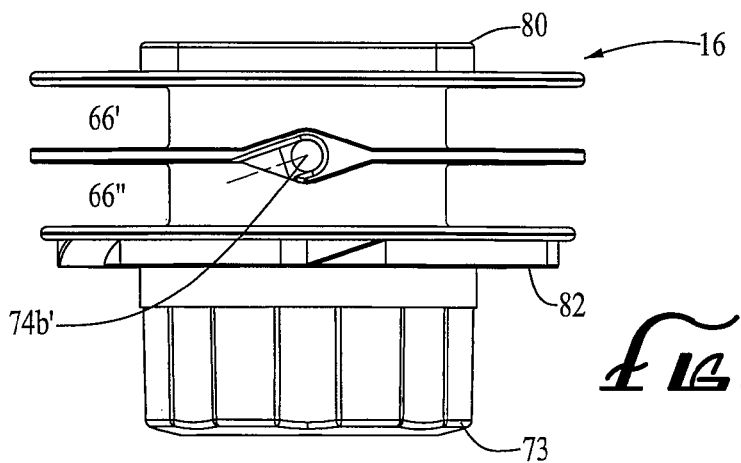
FIG. 13C is a rear view of the spool of the trimmer head shown in FIGS. 1-6C as viewed from the right side of FIG. 14A.

To assist in the winding of the cutting line 17 on to the spool 16 such that the portions of the line projecting from each of the two eyelets is drawn back into separate spool storage areas 66' and 66" and wrapped about the spool as illustrated in FIG. 6C, the opposed ends 74a and 74b of the line receptor channel are configured by the middle spool flange 62 to direct the opposed portions of the line into different spool areas. This can be accomplished by removing portions of the channel wall defined by flange 62 adjacent the two channel ends such that lateral openings 74a' and 74b' are formed in the side wall, communicating channel end 74a with area 66' and channel end 74b with area 66" as shown in FIGS. 13A-13C. By rotating the spool in a clockwise direction while holding the housing stationary with the head in an inverted position (i.e., with the lower spool end 73 facing upwardly), the portion of the trimmer line 17 projecting from the open end 74a of the line receptor is directed into the upper spool storage area 66' and the portion of the trimmer line projecting from channel end 74b is directed into the lower line storage area 66" (see FIG. 13C). Other guide surface configurations could also be employed to direct the opposing line portions into the different spool chambers or storage areas 66' and 66". Printed indicia such as directional arrows 100 (see FIG. 15) are preferably provided on the lower housing 14b to indicate the direction of rotation of the spool with respect to the housing to effect the winding of the line onto the spool.

By recessing the portion 76 of the lower end of the spool through the exposed portion 74c of the line receptor channel extends, the exposed line is protected when the rapidly rotating head is bumped against the ground to pay out fresh lengths of line through the eyelets 32. If desired, additional protection can be afforded by, for example, a protective bridge or a removable cap (not shown) or other protective element that will allow the user to access the trimmer line extending thereover in channel portion 74c. Such a protective element may be particularly desirable for use on abrasive terrain such as gravel.

When the spool 16 is gripped by the lower body portion of the spool 72 and rotated relative to the housing as described above, the lower slide surfaces 82b on the lower cam follower 82 will abut the trailing surfaces 58b on the lower projections 58 causing the spool to translate upwardly with respect to the housing, compressing the coil spring 18. As the manual rotation of the spool continues, the corner portions of the lower cam follower 82 can ride over and clear the projections 58 in the lower portion of the housing whereupon the spring causes the spool to snap downwardly such that the lower projections and lower cam abutment surfaces are again in planar alignment. Thus, this reciprocating movement of the rotating spool, which, although not necessary, is preferably employed in the present invention to provide for an even distribution of the cutting line in the two storage areas 66' and 66" about the upper body of the spool. As a result, the lengths of line tend to roll over themselves and fill the two spool areas without becoming entangled on the spool. Because the upper slide surfaces on the upper projections 44 and the leading (slide) surfaces 80b on the upper cam follower 80 are in abutment, it may prove desirable to incline the trailing surfaces 44b of the upper projections 44 and/or the leading (slide) surfaces 80b of the upper cam follower 80 to provide smoother rotation of the spool with respect to the housing during the loading of the line.

It is to be understood that the line loading and removal features of the present invention could be provided in a rotary trimmer head without the reciprocating feature provided by the sliding surfaces (e.g. 58b and 82b) in the operative connection between the spool and the housing. Alternatively, other means of effecting such linear, reciprocal movement during the winding of the line about the spool could be employed.

The above description of the trimmer head 10 and its components is based on using the head on a conventional rotary trimmer in which the gear box (not shown) typically imparts a counterclockwise rotation to the drive shaft 12 and thus to the trimmer head. If the head were used on a trimmer without a gear box or with one that imparted a clockwise rotation to the head, the leading and trailing surfaces on the cams and cam follower abutment members would simply be reversed. Accordingly, the orientation of the cam features and slide surfaces could be reversed to accommodate a rotary trimmer in which the gear box imparts a clockwise rotation to the drive shaft 12.

The bump-feed mechanism provided by the cams and cam abutment surfaces need not be limited to square cam followers. The same is true of trimmer head 10. The upper and lower cam followers formed by upper and lower portions of the spool, for example, could be three or five sided. Three and five sided cam followers would cooperate with an equal number of cam abutment members in the upper and lower housings as shown in the referenced drawings. The function, cooperation and operation of such cams and cam followers would be otherwise essentially unchanged from that described above.

Figure 16:
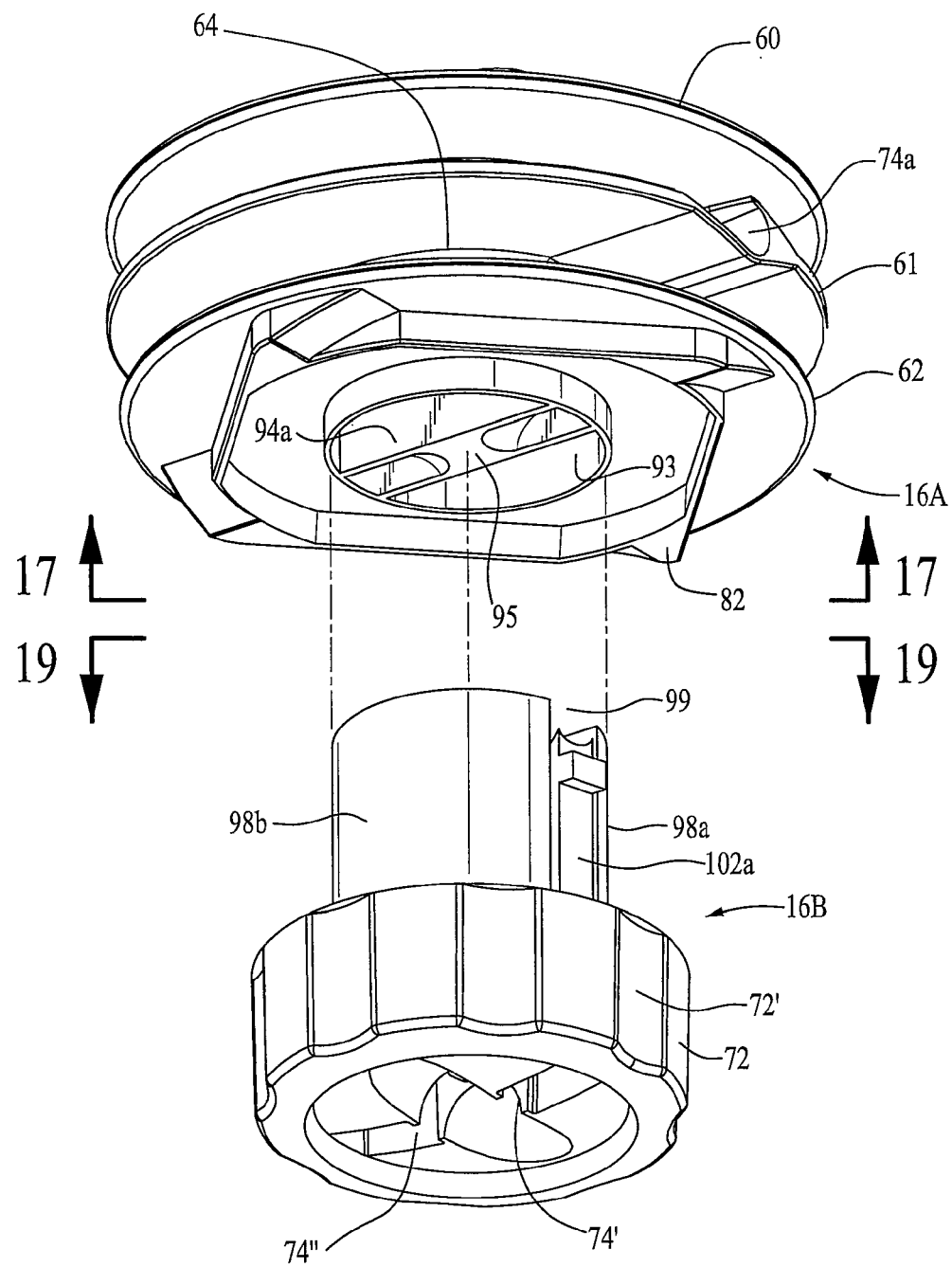
FIG. 16 is an exploded view of the upper and lower spool sections of the present invention.
Figure 17:
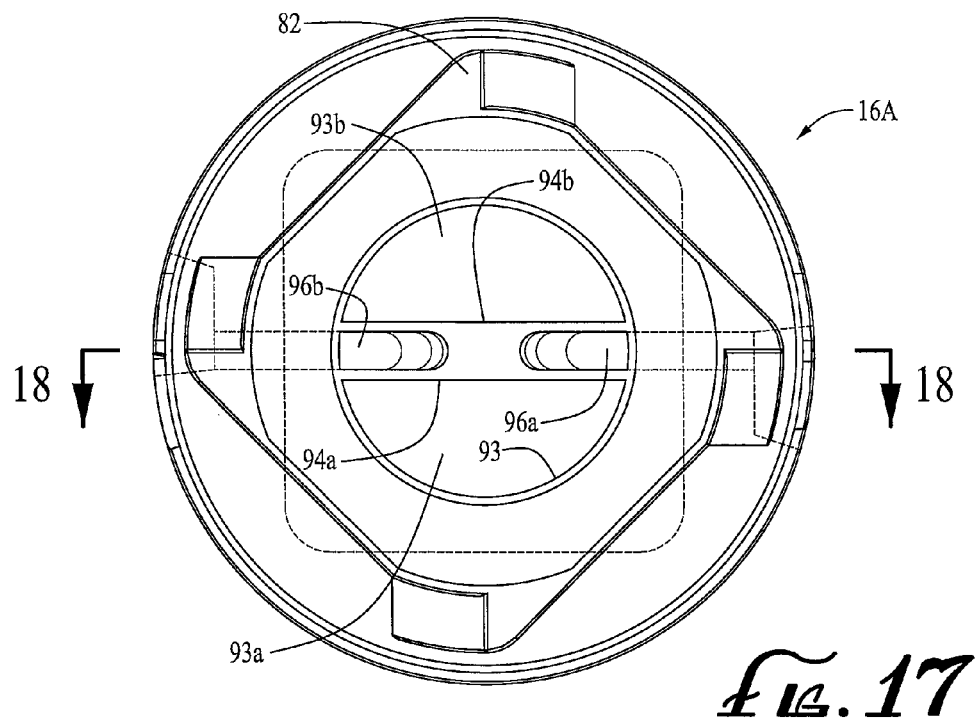
FIG. 17 is a bottom plan view of the upper spool section of the present invention.
Figure 18:
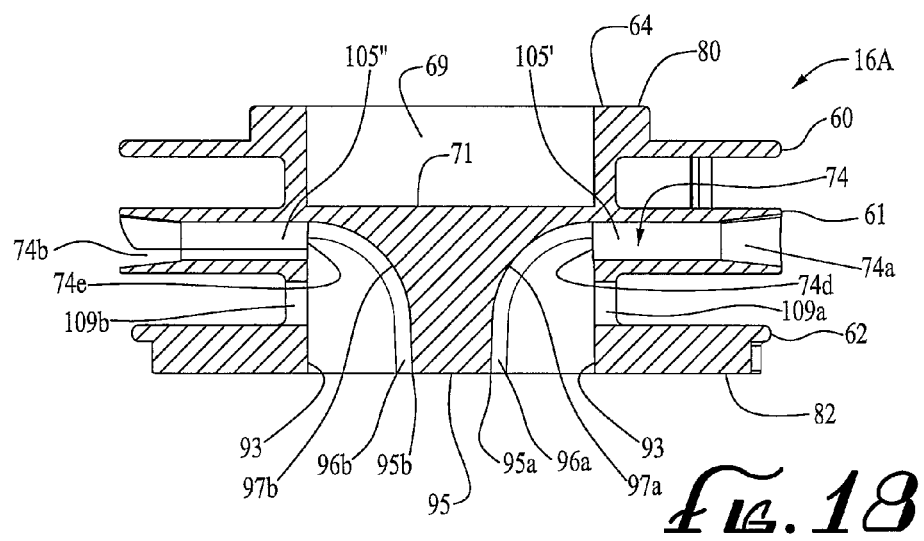
FIG. 18 is a sectional view taken along line 18-18 in FIG. 17.

In a preferred embodiment of the spool 16 of the present invention, the line receptor channel 74 is formed by injection molding the spool 16 in two separate sections, an upper spool section 16A and a lower spool section 16B (See e.g., FIG. 16). The upper spool section 16A includes the upper cylindrical body portion 64 of the spool, flanges 60, 61 and 62, the cylindrical chamber 69, the lower spring abutment surface 71 in the upper end of the spool section, the upper cam follower 80 disposed about cylindrical chamber 69 and the lower cam follower 82 on the lower surface of the lower spool flange 62. The line receptor channel 74 extends radially inwardly as previously described from the opposed outer open ends 74a and 74b thereof in flange 61 and terminates in opposed inner channel openings 74d and 74e respectively on opposed sides of a central cavity 93, preferably cylindrical, so as to communicate the outer open ends 74a and 74b of the line receptor channel 74 with opposed sides of cavity 93. As seen in FIGS. 16-18, the central cavity 93 is open at its lower end and extends upwardly into the interior of the upper body portion 64 of the spool. A pair of spaced parallel vertical walls 94a and 94b depend from the upper end surface of the central cavity 93 and extend across the cavity in parallel alignment between the outer edges of the opposed inner channel openings 74d and 74e. A webbing 95 is centrally disposed between the parallel walls 94a and 94b whereby the central cavity 93 is divided into a pair of opposed large outer cavities 93a and 93b separated by the depending vertical walls and the area between the two walls is divided by webbing 95 into a pair of smaller radially opposed inner cavities 96a and 96b. A pair of guide wall surfaces 97a and 97b extend inwardly and downwardly from locations adjacent the upper ends of the inner channel openings 74d and 74e along opposed curvilinear paths and terminate in substantially vertical orientations at the opposed lower ends 95a and 95b of webbing 95.

The lower spool section 16B, like upper section 16A, preferably is injection molded so as to be of single piece construction and defines the depending lower body portion 72 of the spool that is preferably provided with knurled outer surface 72' and a pair of opposed hollow upstanding projections 98a and 98b that are configured to be received in a mating relationship within cavities 93a and 93b in the upper spool section 16A. In a preferred configuration, the outer wall 98' and 98" of projections 98a and 98b each define segments of a constant radius circle to mate with a cylindrical configuration of the outer surfaces of cavities 93a and 93b in the upper spool section. Similarly, the wall sections 98''' and 98'''' extending between curvilinear walls 98' and 98" are adapted to mate with the outer surfaces of depending walls 94a and 94b upon the upstanding projections 98a and 98b on the lower spool section being inserted into cavities 93a and 93b in the upper spool section when the two spool sections are pressed together. The lower spool section 16B also defines a centrally disposed radially extending opening 99 between the two upstanding projections 98a and 98b that is adapted to receive the depending parallel walls 94a and 94b in the upper spool section 16A. A pair of radially spaced webbings 101a and 101b extend transversely between wall sections 98''' and 98'''' in a central portion of opening 99. Alternatively, webbings 101a and 101b could be formed in a single webbing, similar to webbing 95 in the upper spool section 16A, or webbing 95 could have been formed as two radially spaced webbings like webbings 101a and 101b.

Figure 19:
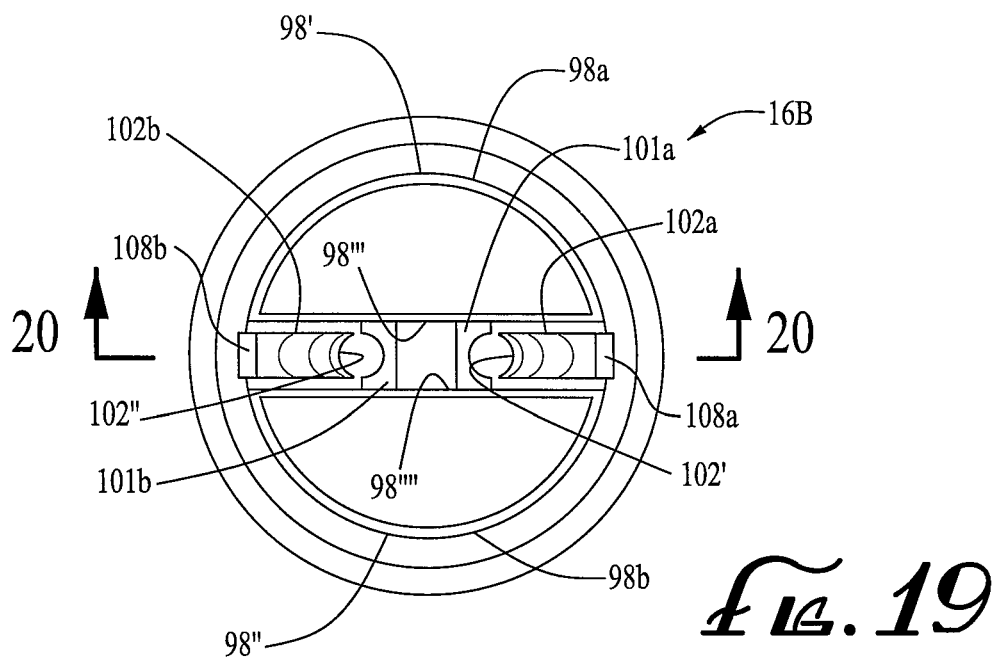
FIG. 19 is a top plan view of the lower spool section of the present invention.
Figure 20:
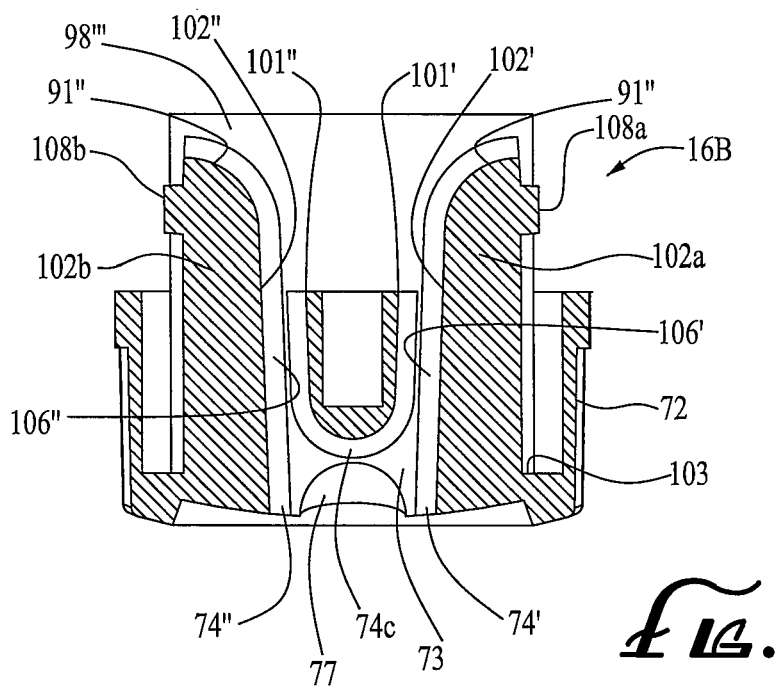
FIG. 20 is a sectional view taken along the line 20-20 in FIG. 19.

A pair of upstanding guide members 102a and 102b also are disposed within opening 99 between wall sections 98''' and 98'''', outwardly spaced from the outer end surfaces 101' and 101" of webbings 101a and 101b. The outer end surfaces 101' and 101" of webbings 101a and 101b preferably are concave as are the inner end surfaces 102' and 102" of the line guide members 102a and 102b, as shown in FIGS. 19 and 20. The concave inner ends of the line guide members extend upwardly from lower interior spool surfaces 103 and curve upwardly and outwardly along curvilinear surfaces 91' and 91" so as to cooperate with the concave outer end surfaces 101' and 101" of webbings 101a and 101b and with the inwardly and downwardly extending opposed guide wall surfaces 97a and 97b in cavities 96a and 96b in the upper spool section 16A so as to define both the curvilinear transitions along curves 75a and 75b between the radially inwardly extending portions 105' and 105" of the line receptor channel 74 and the downwardly extending portions 106' and 106" thereof and provide a continuously smooth inner channel surface over these portions of channel 74.

The pair of radially spaced line inlet/outlet openings 74' and 74" are provided in the lower end 73 of the lower spool section 16B between the lower ends of the guide members 102a and 102b and the lower outer ends of webbing surfaces 101' and 101". The open or exposed transverse portion 74c of channel 74 extends across the lower recessed portion 76 of the spool between the inlet/outlet openings 74' and 74" as previously described to provide access to the cutting line extending therethrough. The previously discussed depressions 77 can also be formed in the lower end of the spool by the molding process to facilitate gripping the line in channel portion 74c.

The guide members 102a and 102b on the lower spool section 16B preferably extend upwardly from a lower interior spool surface 103 without additional lateral support so as to allow the guide members to flex slightly in a radial direction whereby the outer end surfaces of the two guide members can be provided with outwardly projecting locking elements 108a and 108b that can be removably received in a snap fitment within a pair of opposed apertures 109a and 109b formed in the upper spool section below the opposed inner channel openings 74' and 74" upon the upper section 16A of the spool being aligned with the lower spool section 16B and the two spool sections pressed together. Other means for securing the two spool sections together also could be employed. So secured, the two projections 98a and 98b on the lower spool section are received in a mating relationship in the cavities 93a and 93b in the lower spool section and the two guide members 102a and 102b on the lower spool section are received within the opposed inner cavities 96a and 96b in the upper spool section with the two lateral sides of each guide member being disposed against the inner surfaces of the depending walls 94a and 94b in the upper spool section. Such a construction not only allows for the above described smooth interior wall surfaces of the line receptor channel, it also minimizes material usage and concentrations of material to avoid shrinkage problems and the resulting surface imperfections in the finished spool. The result is a lightweight, relatively inexpensive and attractive spool that retains all of the line loading and unloading benefits described earlier herein.

Figure 14A:
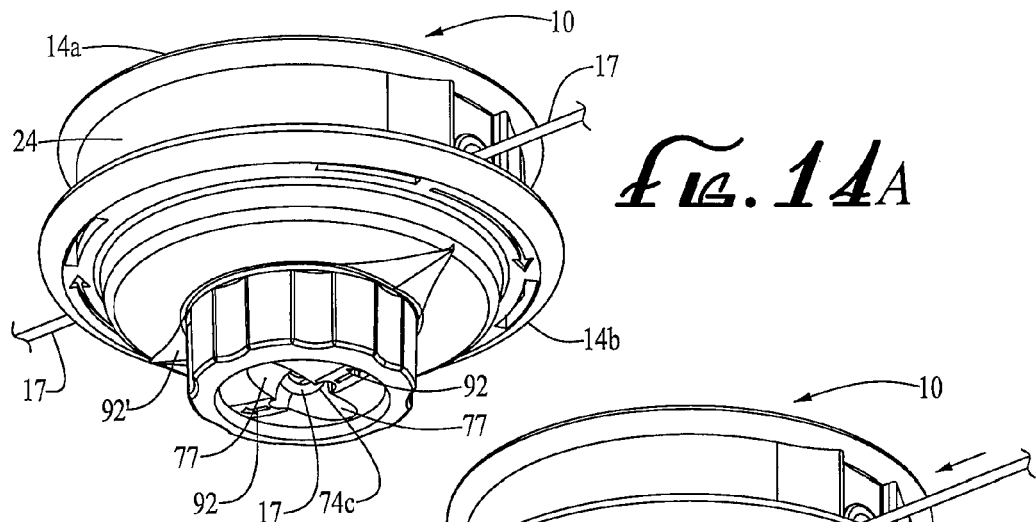
FIG. 14A is a perspective view of the trimmer head shown in FIGS. 1-6C as seen from below and with the cutting line loaded thereon.
Figure 14B:
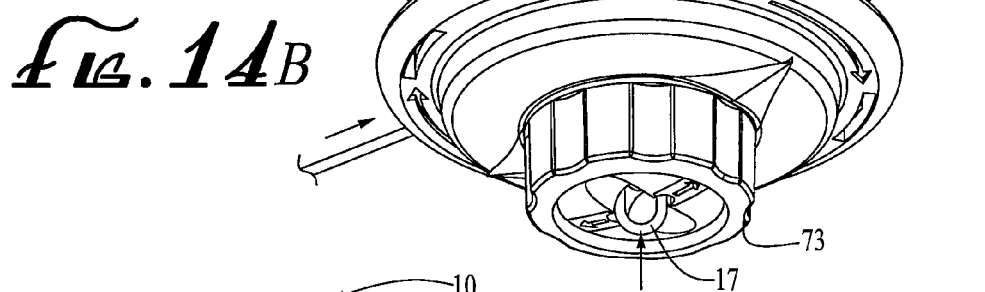
FIG. 14B is a perspective view of the trimmer head shown in FIGS. 1-6C as seen from below and illustrating the cutting line as it begins to be withdrawn from the lower open portion of the line receptor channel.
Figure 14C:
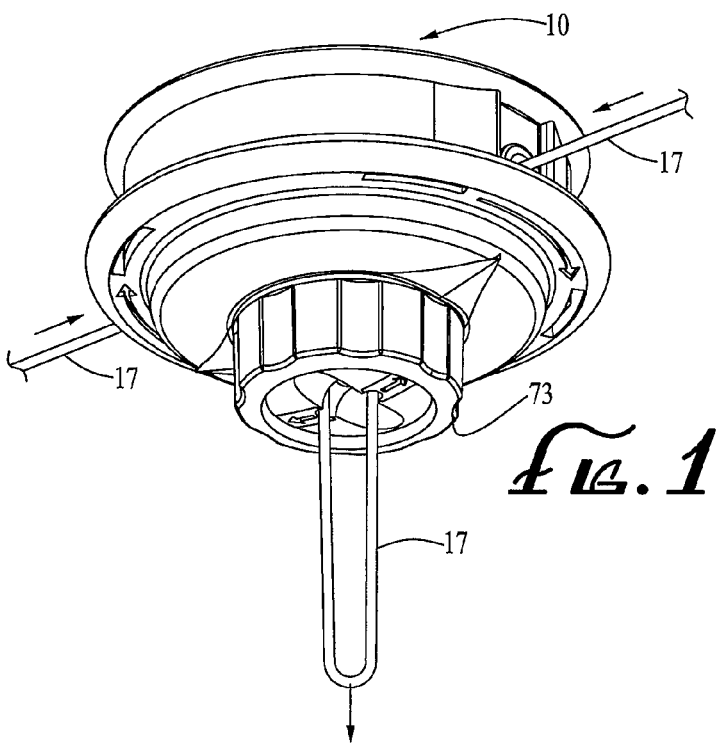
FIG. 14C is a perspective view of the trimmer head shown in FIGS. 1-6C as seen from below and illustrating the cutting line as it further withdrawn from the lower open portion of the line receptor channel.

In the event that the cutting line were to break during use proximate one of the eyelets 32, the trimmer line inwardly adjacent the break retracts into the head so that additional fresh line cannot be payed out by simply bumping the head on the ground. With the present invention, the user can grasp the portion of the cutting line extending across the open or exposed portion 74c of the line receptor channel 74 and pull the line downwardly as illustrated in FIGS. 14B and 14C. The downward pulling on the line in a direction parallel, if not coincident to the axis of rotation of the spool, will effect an unraveling of the line off the spool, allowing all of the line to be pulled downwardly from the spool through the laterally-spaced openings 74' and 74" in the bottom of the spool. Thus, the old line can be removed from the trimmer head without having to split the head (remove the spool from the housing) or otherwise interrupt the operative connection between the spool and the housing. The removed line or a new length of fresh line can then be re-loaded onto the head using the line receptor channel as earlier described, again without having to split the head.

Figure 15:
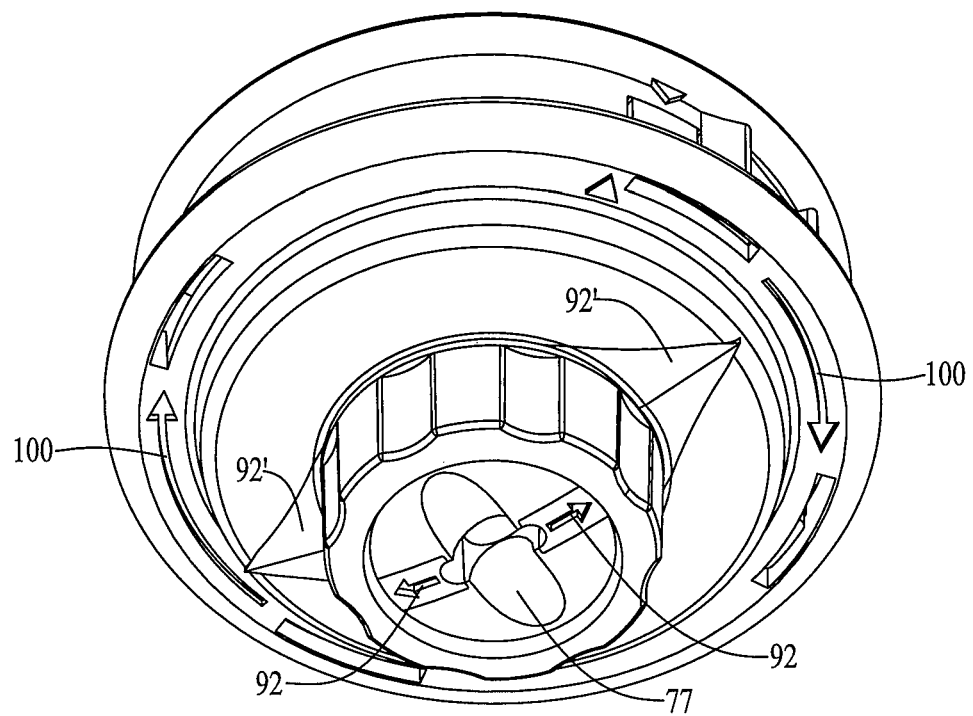
FIG. 15 is an enlarged perspective view of the trimmer head shown in FIGS. 1-6C as seen from below and illustrating indicia adjacent the underside of the lowermost end of the spool for aligning the line receptor channel in the spool with the opposed eyelets in the depending annular skirt of the upper housing and indicia on the lower housing for indicating the direction of rotation of the spool relative to the housing during the winding of the cutting line onto the spool.
Figure 21:
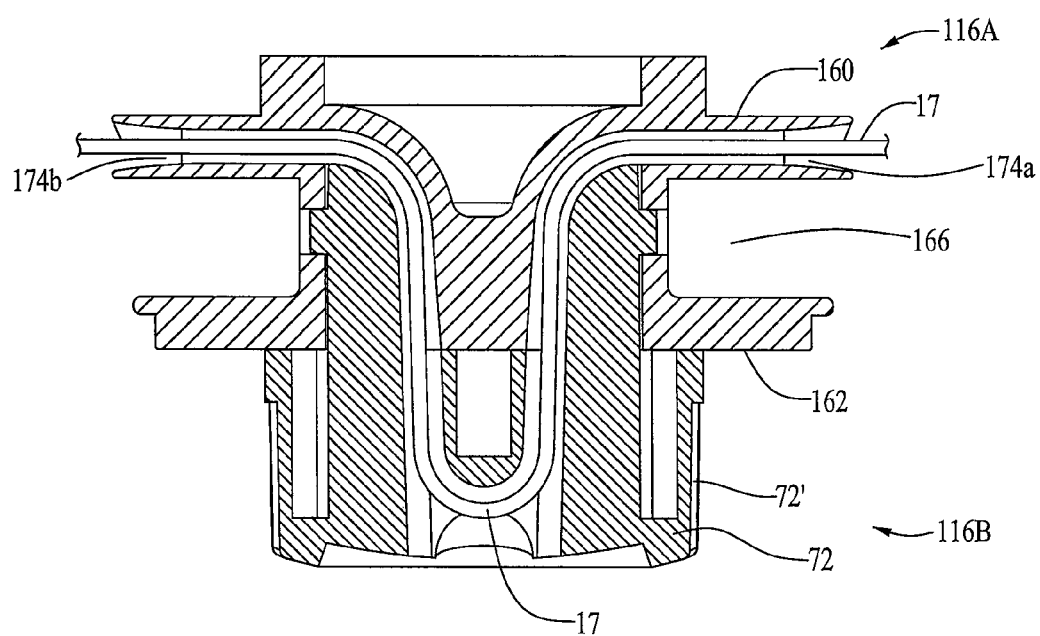
FIG. 21 is a sectional side view of an alternate embodiment of the spool of the present invention.

The spools illustrated in FIGS. 1-14C are dual area spools in which the portion of the line extending from one eyelet is wrapped about one area of the spool or spool chamber (e.g. 66') and the portion of the cutting line exiting another eyelet is wrapped about another of the spool (e.g. 66"). It is to be understood that the present invention could also be employed with a single chamber spool such as that illustrated in FIG. 21. In that embodiment, the line receptor channel openings 174a and 174b are defined by the upper flange 160. Flange 160 cooperates with a lower flange 162 to form a single line storage area 166 and the spool 116 is configured relative to the housing (not shown) such that the opposed line receptor channel openings in flange 160 are radially aligned with the housing eyelets (not shown). Spool 116 defines the same cam and cam follower surfaces as spool 16 and cooperates in the same manner as spool 16 with its associated upper and lower housings. Spool 116 could be manufactured in two spool sections 116A and 116B in the same manner as spool 16 as shown in FIG. 21. Essentially, the lower spool section 116B in spool 116, other than sizing, it would be substantially identical to lower spool section 16B of the prior embodiment. Upper spool section 116A differs from spool section 16A in the removal of a center flange 61 and the moving of the portions of the line receptor channel 74 previously in flange 61 to upper flange 160 as shown in FIG. 15.

Figure 22:
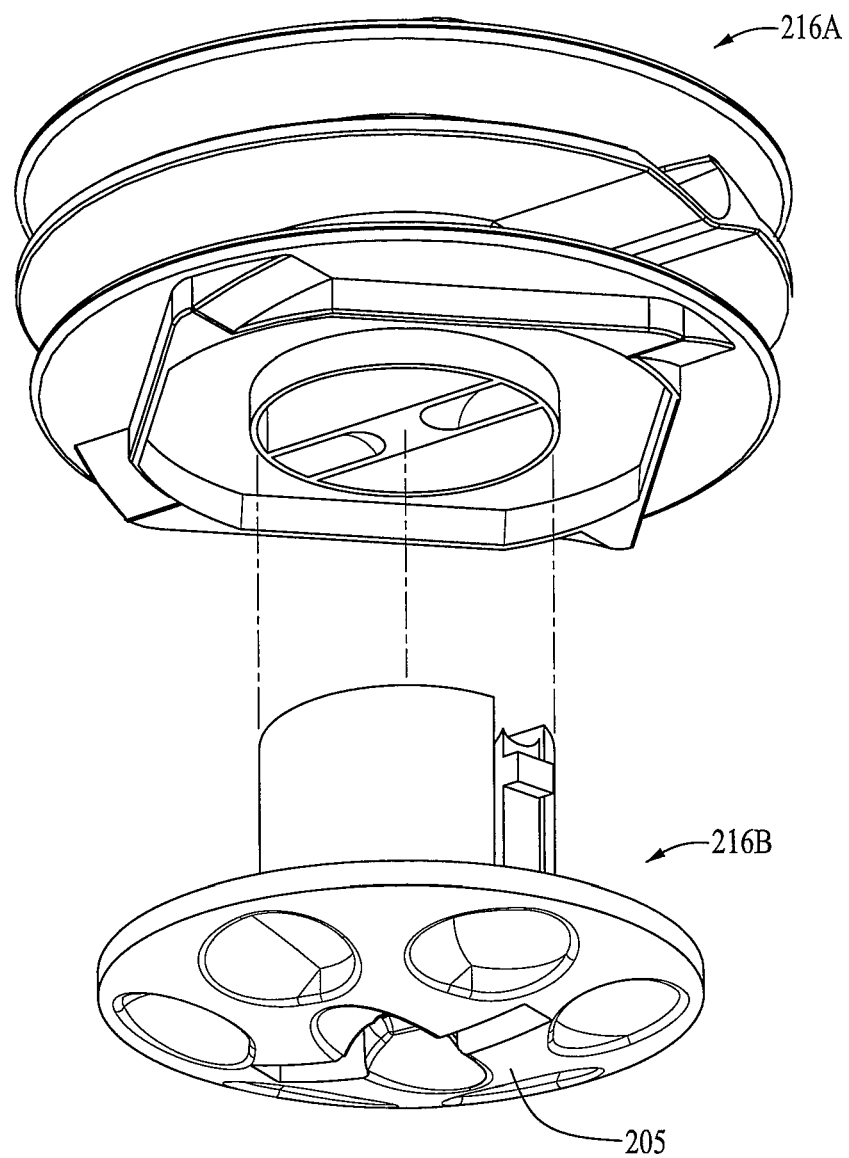
FIG. 22 is a side view of a second alternate embodiment of the spool of the present invention.

FIG. 22 shows an alternate embodiment of the spool adopted for use in a new aerodynamic head configuration that is the subject of pending U.S. patent application Ser. No. 12/717,908 filed on Mar. 4, 2010. As seen therein, the upper spool section 216A is of the same configuration as upper spool section 16 of the first embodiment. Lower spool section 216B differs from the lower spool section 16B of the first embodiment in the configuration of the lower body portion of the spool. Unlike the lower body portion 72 of spool 16 with its generally cylindrical configuration and outer knurled surfaced 72', the lower body portion 72 of lower spool section 216 defines an outer curvilinear surface 205 that is configured to mate with and merge into an annular lower portion of a trimmer head housing so as to provide a continuously smooth aerodynamic interface between the lower end of the spool and a curvilinear annular surface of the lower housing.

Other spool configurations also could be employed utilizing the above-described mating relationship of the upper and lower spool sections to provide an improved spool for line loading mechanisms of the type described. Also, mating elements on the upper and lower spool sections could be reversed. Thus, the spool construction of the present invention can be employed in a wide variety of trimmer head types and configurations. Various other changes and modifications also could be made in carrying out the present invention without departing from the spirit and scope thereof. Insofar as such changes and modifications are within the purview of the appended claims, they are to be considered as part of the present invention.

What is claimed is:

1. An improved spool construction for carrying a length of cutting line in a trimmer head housing on a flexible line rotary trimmer wherein the spool includes a cylindrical body portion, at least one flange projecting radially therefrom and a line receptor channel that traverses the spool and defines opposed open outer ends in said flange radially alignable with opposed line openings in a housing skirt and an open channel portion in a lower spool surface to provide access to the channel intermediary of the open ends with the spool operatively connected to the housing for line loading and replacement without having to interrupt the operative connection between the spool and the housing, the improved spool construction comprising:

a molded upper spool section of single piece construction defining at least an upper portion of the cylindrical body portion, the radially projecting flange, a pair of outer cavities, a pair of inner cavities, opposed radial portions of the line receptor channel extending inwardly through said flange and communicating the opposed open ends of the channel with said outer cavities at opposed inner channel openings and a pair of opposed guide surfaces extending inwardly and downwardly along opposed curvilinear paths defined by upper and inner ends of said inner cavities;

a molded lower spool section of single piece construction adapted to be secured in a mating relationship to said upper spool section, said lower spool section defining the open channel portion in the lower spool surface, a pair of radially spaced apertures in said lower spool surface communicating with said open channel portion, a pair of hollow upwardly extending and laterally spaced projections configured to be received in a mating relationship within said outer cavities in said upper spool section, a pair of radially spaced webbings extend transversely between said upstanding projections, a pair of upstanding line guide members disposed proximate outer end surfaces of said webbings and adapted to be received within said radially opposed inner cavities in said upper spool section such that upon said upper and lower spool sections being pressed together, inner end surfaces of said line guide members and the outer end surfaces of said webbings cooperate with said inwardly and downwardly extending guide surfaces in said upper spool section so as to define opposed interior portions of said line receptor channel communicating with said opposed radial portions thereof along a continuously smooth interior channel surface and with said open channel portion through said apertures; and means for securing said upper spool section to said lower spool section.

2. The spool construction of claim 1 wherein said securing means comprises a pair of outwardly projecting protuberances carried by opposed upper end portions of said upstanding line guide members and a pair of opposed apertures communicating with said inner cavities in said upper spool section, said protuberances being removably received in said opposed apertures upon said upper and lower spool sections being pressed together, thereby releasably securing together said spool sections.

3. The spool construction of claim 1 wherein said upper spool section includes an upper flange and a lower flange and said one flange is disposed therebetween and cooperates therewith to define upper and lower cutting line storage areas therebetween about said upper body portion and wherein said one flange defines first and second guide surfaces, said first guide surface being configured to direct cutting line extending outwardly through one of said opposed open outer ends of said line receptor channel into said upper cutting line storage area and the other of said guide surfaces being configured so as to direct line extending from the other of said opposed ends of said line receptor channel into said lower storage area.

4. An improved spool construction for carrying a length of cutting line in a trimmer head housing on a flexible line rotary trimmer wherein the spool includes a cylindrical body portion, at least one flange projecting radially therefrom and a line receptor channel that traverses the spool and defines opposed open outer ends in said flange radially alignable with opposed line openings in a housing skirt and an open channel portion in a lower spool surface to provide access to the channel intermediary of the open ends with the spool operatively connected to the housing for line loading and replacement without having to interrupt the operative connection between the spool and the housing, the improved spool construction comprising:

a molded upper spool section of single piece construction defining at least an upper portion of the cylindrical body portion, the radially projecting flange, opposed radial portions of the line receptor channel extending inwardly through said flange and terminating in opposed inner channel openings and a pair of opposed guide surfaces extending inwardly and downwardly along opposed curvilinear paths;

a molded lower spool section of single piece construction adapted to be secured in a mating relationship to said upper spool section, said lower spool section defining the open channel portion in the lower spool surface, a pair of radially spaced apertures in said lower spool surface communicating with said open channel portion, a pair of radially spaced upstanding opposed guide surfaces, a pair of upstanding line guide members, one of said guide members being disposed proximate one of said upstanding opposed guide surfaces such that upon said upper and lower spool sections being pressed together, inner end surfaces of said line guide members and said upstanding opposed guide surfaces cooperate with said inwardly and downwardly extending guide surfaces in said upper spool section so as to define opposed interior portions of said line receptor channel communicating with said opposed radial portions thereof along a continuously smooth interior channel surface and with said open channel portion through said apertures; and means for securing said upper spool section to said lower spool section.

5. The spool construction of claim 4 wherein said securing means comprises a pair of outwardly projecting protuberances carried by opposed upper end portions of said upstanding line guide members and a pair of opposed apertures disposed in said upper spool section, said protuberances being received in said opposed apertures upon said upper and lower spool sections being pressed together, thereby securing together said spool sections.

6. The spool construction of claim 4 wherein said upper spool section includes an upper flange and a lower flange and said one flange is disposed therebetween and cooperates therewith to define upper and lower cutting line storage areas therebetween about said upper body portion and wherein said one flange defines first and second guide surfaces, said first guide surface being configured to direct cutting line extending outwardly through one of said opposed open outer ends of said line receptor channel into said upper cutting line storage area and the other of said guide surfaces being configured so as to direct line extending from the other of said opposed ends of said line receptor channel into said lower storage area.

7. An improved spool construction for carrying a length of cutting line in a trimmer head housing on a flexible line rotary trimmer wherein the spool includes a cylindrical body portion, at least one flange projecting radially therefrom and a line receptor channel that traverses the spool and defines opposed open outer ends in said flange radially alignable with opposed line openings in a housing skirt and an open channel portion in a lower spool surface to provide access to the channel intermediary of the open ends with the spool operatively connected to the housing for line loading and replacement without having to interrupt the operative connection between the spool and the housing, the improved spool construction comprising:

a molded upper spool section of single piece construction defining at least an upper portion of the cylindrical body portion, the radially projecting flange, a pair of depending parallel walls extending across an open cavity and forming a pair of outer cavities, opposed radial portions of the line receptor channel extending inwardly through said flange and communicating the opposed open ends of the channel with said cavity at opposed inner channel openings disposed between said depending walls and a pair of opposed guide surfaces extending inwardly and downwardly between said depending walls along opposed curvilinear paths from said inner channel openings and terminating in radially spaced substantially vertical orientations so as to define a pair of radially spaced inner cavities between said depending walls, said inner cavities being bordered along upper and inner ends thereof by said curvilinear guide surfaces;

a molded lower spool section of single piece construction adapted to be secured in a mating relationship to said upper spool section, said lower spool section defining the open channel portion in the lower spool surface, a pair of radially spaced apertures in said lower spool surface communicating with said open channel portion, a pair of hollow upwardly extending and laterally spaced projections configured to be received in a mating relationship within the outer cavities in said upper spool section, at least one webbing extending transversely between said upstanding projections, a pair of upstanding line guide members disposed proximate outer end surfaces of said webbing and adapted to be received within said inner cavities in said upper spool section such that upon said upper and lower spool sections being pressed together, inner end surfaces of said line guide members and the outer end surfaces of said webbings cooperate with said inwardly and downwardly extending guide surfaces in said upper spool section so as to define opposed interior portions of said line receptor channel communicating with said opposed radial portions thereof along a continuously smooth interior channel surface and with said open channel portion through said apertures; and means for securing said upper spool section to said lower spool section.

8. The spool construction of claim 7 wherein said securing means comprises a pair of outwardly projecting protuberances carried by opposed upper end portions of said upstanding line guide members and a pair of opposed apertures disposed between said depending parallel walls, said protuberances being received in said opposed apertures upon said upper and lower spool sections being pressed together, thereby securing together said spool sections.

9. An improved spool construction for carrying a length of cutting line in a trimmer head housing on a flexible line rotary trimmer wherein the spool includes a cylindrical body portion, at least one flange projecting radially therefrom and a line receptor channel that traverses the spool and defines opposed open outer ends in said flange radially alignable with opposed line openings in a housing skirt and an open channel portion in a lower spool surface to provide access to the channel intermediary of the open ends with the spool operatively connected to the housing for line loading and replacement without having to interrupt the operative connection between the spool and the housing, the improved spool construction comprising:

a molded upper spool section of single piece construction defining at least an upper portion of the cylindrical body portion, the radially projecting flange, opposed radial portions of the line receptor channel extending inwardly through said flange and a plurality of opposed guide surfaces extending inwardly and downwardly along opposed curvilinear paths;

a molded lower spool section of single piece construction adapted to be secured in a mating relationship to said upper spool section, said lower spool section defining the open channel portion in the lower spool surface, a pair of radially spaced apertures in said lower spool surface communicating with said open channel portion and a plurality of opposed guide surfaces configured so as to cooperate with said guide surfaces in said upper spool section upon said upper and lower spool sections being pressed together, so as to define opposed interior portions of said line receptor channel communicating with said opposed radial portions thereof along a continuously smooth interior channel surface and with said open channel portion through said apertures; and means for securing said upper spool section to said lower spool section.

10. The spool construction of claim 9 wherein said upper spool section includes an upper flange and a lower flange and said one flange is disposed therebetween and cooperates therewith to define upper and lower cutting line storage areas therebetween about said upper body portion and wherein said one flange defines first and second guide surfaces, said first guide surface being configured to direct cutting line extending outwardly through one of said opposed open outer ends of said line receptor channel into said upper cutting line storage area and the other of said guide surfaces being configured so as to direct line extending from the other of said opposed ends of said line receptor channel into said lower storage area.

11. The spool construction of claim 9 including a pair of cavities in one of said spool sections, a pair of hollow projections in the other of said spool sections, said projections being adapted to be received in said cavities in a mating relationship to effect alignment of said guide surfaces in said upper spool section with said guide surfaces in said lower spool section.

12. The spool construction of claim 9 including a pair of upstanding opposed guide members in said lower spool section and wherein a pair of opposed guide surfaces in said lower spool section are defined by inner end surfaces of said guide member and said securing means comprises a pair of outwardly projecting protuberances carried by opposed upper end portions of said upstanding line guide members and a pair of opposed apertures disposed in said upper spool section, said protuberances being received in said opposed apertures upon said upper and lower spool sections being pressed together, thereby securing together said spool sections.

* * * * *